United States Patent
Chou et al.

(10) Patent No.: US 11,616,960 B2
(45) Date of Patent: Mar. 28, 2023

(54) MACHINE LEARNING VIDEO PROCESSING SYSTEMS AND METHODS

(71) Applicant: Apple Inc., Cupertino, CA (US)

(72) Inventors: Jim C. Chou, San Jose, CA (US); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 17/210,478

(22) Filed: Mar. 23, 2021

(65) Prior Publication Data

US 2021/0211683 A1  Jul. 8, 2021

Related U.S. Application Data

(63) Continuation of application No. 15/874,655, filed on Jan. 18, 2018, now Pat. No. 10,979,718.

(Continued)

(51) Int. Cl.
*H04N 19/159* (2014.01)
*H04N 19/154* (2014.01)
(Continued)

(52) U.S. Cl.
CPC ......... *H04N 19/159* (2014.11); *G06N 3/0454* (2013.01); *G06N 3/08* (2013.01);
(Continued)

(58) Field of Classification Search
CPC .. H04N 19/159; H04N 19/102; H04N 19/117; H04N 19/132; H04N 19/136;
(Continued)

(56) References Cited

U.S. PATENT DOCUMENTS

| 6,075,884 A | 6/2000 | Lubin et al. |
| 10,019,642 B1 | 7/2018 | Navarrete Michelini et al. |

(Continued)

FOREIGN PATENT DOCUMENTS

| CN | 102065302 A | 5/2011 |
| CN | 106162199 A | 11/2016 |

OTHER PUBLICATIONS

Dai et al.; "A Convolutional Neural Network Approach for Post-Processing in HEVC Intra Coding", Dec. 31, 2016, Medical Image Computing and Computer-Assisted Intervention—MICCAI 2015; 18th International Conference, Oct. 5-9, 2015; Proceedings; XP047405204.

(Continued)

*Primary Examiner* — Mekonen T Bekele
(74) *Attorney, Agent, or Firm* — Fletcher Yoder, P.C.

(57) ABSTRACT

System and method for improving video encoding and/or video decoding. In embodiments, a video encoding pipeline includes a main encoding pipeline that compresses source image data corresponding with an image frame by processing the source image data based at least in part on encoding parameters to generate encoded image data. Additionally the video encoding pipeline includes a machine learning block communicatively coupled to the main encoding pipeline, in which the machine learning block analyzes content of the image frame by processing the source image data based at least in part on machine learning parameters implemented in the machine learning block when the machine learning block is enabled by the encoding parameters; and the video encoding pipeline adaptively adjusts the encoding parameters based at least in part on the content expected to be present in the image frame to facilitate improving encoding efficiency.

20 Claims, 10 Drawing Sheets

Related U.S. Application Data

(60) Provisional application No. 62/553,587, filed on Sep. 1, 2017.

(51) Int. Cl.
*H04N 19/59* (2014.01)
*H04N 19/86* (2014.01)
*H04N 19/46* (2014.01)
*G06T 9/00* (2006.01)
*G06N 3/04* (2023.01)
*G06N 3/08* (2023.01)
*H04N 19/102* (2014.01)
*H04N 19/117* (2014.01)
*H04N 19/189* (2014.01)
*H04N 19/132* (2014.01)
*H04N 19/90* (2014.01)
*H04N 19/136* (2014.01)
*H04N 19/172* (2014.01)
*H04N 19/436* (2014.01)

(52) U.S. Cl.
CPC ........... *G06T 9/002* (2013.01); *H04N 19/102* (2014.11); *H04N 19/117* (2014.11); *H04N 19/132* (2014.11); *H04N 19/136* (2014.11); *H04N 19/154* (2014.11); *H04N 19/172* (2014.11); *H04N 19/189* (2014.11); *H04N 19/46* (2014.11); *H04N 19/59* (2014.11); *H04N 19/86* (2014.11); *H04N 19/90* (2014.11); *H04N 19/436* (2014.11)

(58) Field of Classification Search
CPC .. H04N 19/154; H04N 19/172; H04N 19/189; H04N 19/46; H04N 19/59; H04N 19/86; H04N 19/90; H04N 19/436; H04N 19/40
See application file for complete search history.

(56) References Cited

U.S. PATENT DOCUMENTS

| | | | |
|---|---|---|---|
| 10,426,442 B1 | 10/2019 | Schnorr | |
| 10,602,163 B2 | 3/2020 | Van Leuven et al. | |
| 10,979,718 B2 * | 4/2021 | Chou | H04N 19/86 |
| 11,232,319 B2 * | 1/2022 | Udupa | G06T 7/136 |
| 2003/0227539 A1 | 12/2003 | Bonnery et al. | |
| 2003/0236661 A1 | 12/2003 | Burges et al. | |
| 2016/0292589 A1 | 10/2016 | Taylor, Jr. et al. | |
| 2016/0379092 A1 | 12/2016 | Kutliroff | |
| 2017/0078686 A1 | 3/2017 | Coward et al. | |
| 2017/0094297 A1 | 3/2017 | Gu et al. | |
| 2017/0214912 A1 | 7/2017 | Cote et al. | |
| 2018/0121626 A1 | 5/2018 | Abedini et al. | |
| 2018/0205965 A1 | 7/2018 | Chen et al. | |
| 2018/0239992 A1 | 8/2018 | Chalfin et al. | |
| 2018/0300855 A1 * | 10/2018 | Tang | G06T 3/4053 |
| 2019/0026555 A1 | 1/2019 | Cabral et al. | |
| 2019/0230354 A1 | 7/2019 | Kim | |
| 2020/0304802 A1 * | 9/2020 | Habi | G06N 3/0472 |
| 2022/0328189 A1 * | 10/2022 | Zhou | G06V 10/7753 |

OTHER PUBLICATIONS

Zhang et al.; "Learning structure of stereoscopic image for no-reference quality assessment with convolutional neural network". Pattern Recognition, vol. 59, Feb. 6, 2016; pp. 176-187 (XP029695435).

Al-Barwani et al.; "A machine learning based framework for parameter based multi-objective optimisation of a H.265 video CODEC," 2016 Future Technologies Conference (FTC) IEEE, Dec. 6, 2016, pp. 553-559 (XP033044513).

Invitation to Pay Additional Fees w/Partial International Search Results for PCT Application No. PCT/US2018/041317 dated Oct. 16, 2018; 22 pgs.

\* cited by examiner

MACHINE LEARNING VIDEO PROCESSING SYSTEMS AND METHODS

CROSS REFERENCE TO RELATED APPLICATIONS

This is a continuation application of U.S. patent application Ser. No. 15/874,655, filed Jan. 18, 2018, entitled "Machine Learning Video Processing Systems and Methods," which claims priority to U.S. Provisional Application No. 62/553,587, filed Sep. 1, 2017, entitled "Machine Learning Video Processing Systems and Methods," the contents of which are incorporated by reference in their entireties for all purposes.

BACKGROUND

The present disclosure generally relates to video processing and, more particularly, to processing (e.g., encoding, decoding, analyzing, and/or filtering) image data based at least in part on machine learning techniques.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To present visual representations of information, an electronic device may utilize an electronic display to display one or more images (e.g., image frames) based on corresponding image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display an image, the electronic device may decode encoded image data and instruct the electronic display to adjust luminance of its display pixels based on the decoded image data.

In some instances, image data may be encoded based at least in part on prediction techniques. For example, image data corresponding with a portion (e.g., block) of an image frame may be encoded based on a prediction sample, which indicates a prediction of at least the portion of the image frame. Since image frames often change gradually, the prediction sample may be determined based on image data from the same image frame, for example, using intra prediction techniques. Additionally, since successive image frames are often similar, the prediction sample may be determined based on image data from a directly previous and/or a directly subsequent image frame, for example, using inter prediction techniques.

In any case, prediction samples may be determined based on encoding parameters, for example, which indicate whether to use an inter prediction technique or an intra prediction technique. Varying the encoding parameters may result in different prediction samples and, thus, different resulting encoded image data. Accordingly, in some instances, varying the encoding parameters may affect encoding efficiency (e.g., size of encode image data and/or encoding throughput), decoding efficiency (e.g., decoding throughput), and/or video quality expected to result when corresponding decoded image data is used to display an image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving video encoding and/or video decoding, for example, by improving encoding efficiency, decoding efficiency, and/or perceived video quality when decoded image data is used to display an image (e.g., image frame) on an electronic display. To facilitate reducing resource usage, image data may be encoded (e.g., compressed) to reduce size. For example, a video encoding pipeline may encode source image data based at least in part on prediction techniques, such as inter prediction techniques and/or intra prediction techniques.

To prediction encode source image data, a prediction sample (e.g., predictor), which indicates a prediction of the source image data, may be determined by operating based at least in part on encoding parameters. Based on the prediction sample, a prediction residual, which indicates difference between the prediction sample and the source image data, may be determined. The prediction residual along with the encoding parameters implemented to determine the prediction residual be transcoded as encoded image data.

In some instances, implementing different encoding parameters may result in different prediction samples and, thus, varying degrees of matching between source image data and the prediction samples. Moreover, in some instances, the matching degree may affect encoding efficiency (e.g., encoded image data size, encoding power consumption, and/or encoding throughput), decoding efficiency (e.g., decoding power consumption and/or decoding throughput), and/or perceived image quality when decoded image data is used to display an image frame.

Accordingly, the present disclosure provides techniques to improve video encoding and/or video decoding, for example, by improving the degree that a prediction sample is expected to match corresponding source image data. To facilitate improving video encoding and/or video decoding, in some embodiments, a machine learning block may be implemented (e.g., in a video encoding pipeline and/or a video decoding pipeline) to leverage machine learning techniques, such as convolutional neural network (CNN) techniques. When enabled, the machine learning block may analyze input image data (e.g., source image data, reconstructed image data, decoded image data, and/or encoded image data) to determine expected characteristics, such as texture, gradient, color, dynamic range, sharpness, motion, and/or edges, of a corresponding image and indicate the expected characteristics, for example, via one or more feature metrics.

To facilitate identifying characteristics of an image, a machine learning block may be trained to determine machine learning parameters. For example, when the machine learning block implements convolutional neural network (CNN) techniques, the machine learning parameters may indicate number of convolution layers, interconnections between layers, and/or weights (e.g., coefficients) corresponding to each convolution layer. After training, the machine learning block may provide content analysis used to adaptively adjust encoding parameters and/or decoding parameters.

For example, when a prediction technique is to be implemented, the video encoding pipeline may determine a prediction sample by down-sampling (e.g., source image data and/or prediction residuals), applying a forward transform and a forward quantization, applying an inverse quantization and an inverse transform, and upscaling. In some embodiments, the video encoding pipeline may down-scale and/or up-scale based on encoding parameters, for example, which indicate target aspect ratio, target filter (e.g., interpolation) weighting, and/or target filter mode. By leveraging the content analysis provided by the machine learning block, the video encoding pipeline may adaptively adjust the encoding parameters used to determine the prediction sample in a content dependent manner, which at least in some instances may facilitate improving video processing (e.g., encoding and/or decoding), for example, by improving degree of matching between the prediction sample and the source image data.

To facilitate further improving video quality, decoded image data may be filtered based at least in part on filter parameters to reduce likelihood of displaying a perceivable visual artifact when used to display a corresponding image. In some embodiments, the filter parameters may be determined by leveraging machine learning techniques, for example, using a machine learning block to obviate hand (e.g., trial and error) tuning of the filter parameters. By utilizing the machine learning block, the filter parameters to be applied to decoded image data may be adaptively adjusted in a content dependent manner, which at least in some instances may facilitate improving perceived video quality, for example, by reducing likelihood of displaying perceivable visual artifacts.

Determination of expected video quality may additionally or alternatively be improved by leveraging machine learning techniques. In some embodiments, expected video quality may be determined using a machine learning block, for example, implemented in a video encoding pipeline and/or a video decoding pipeline. To facilitate determining expected video quality, in some embodiments, the machine learning block may be trained based on training image data and corresponding actual video quality. For example, the machine learning block may be trained by adjusting its machine learning parameters such that expected video quality determined based on a feature metric matches the actual video quality.

Based at least in part on the expected video quality, in some embodiments, encoding parameters and/or filter parameters may be adaptively adjusted to facilitate improving perceived video quality when decoded image data is used to display a corresponding image. Moreover, by implementing a machine learning block, encoding parameters and/or decoding parameters may be adaptively adjusted to facilitate improving encoding efficiency and/or decoding efficiency. In this manner, the techniques described in the present disclosure may facilitate improving video processing (e.g., encoding, decoding, analyzing, and/or filtering) by implementing (e.g., training and operating) one or more machine learning blocks to adaptively adjust image data processing in a content dependent manner.

BRIEF DESCRIPTION OF THE DRAWINGS

Various aspects of this disclosure may be better understood upon reading the following detailed description and upon reference to the drawings in which.

DETAILED DESCRIPTION

Figure 1:
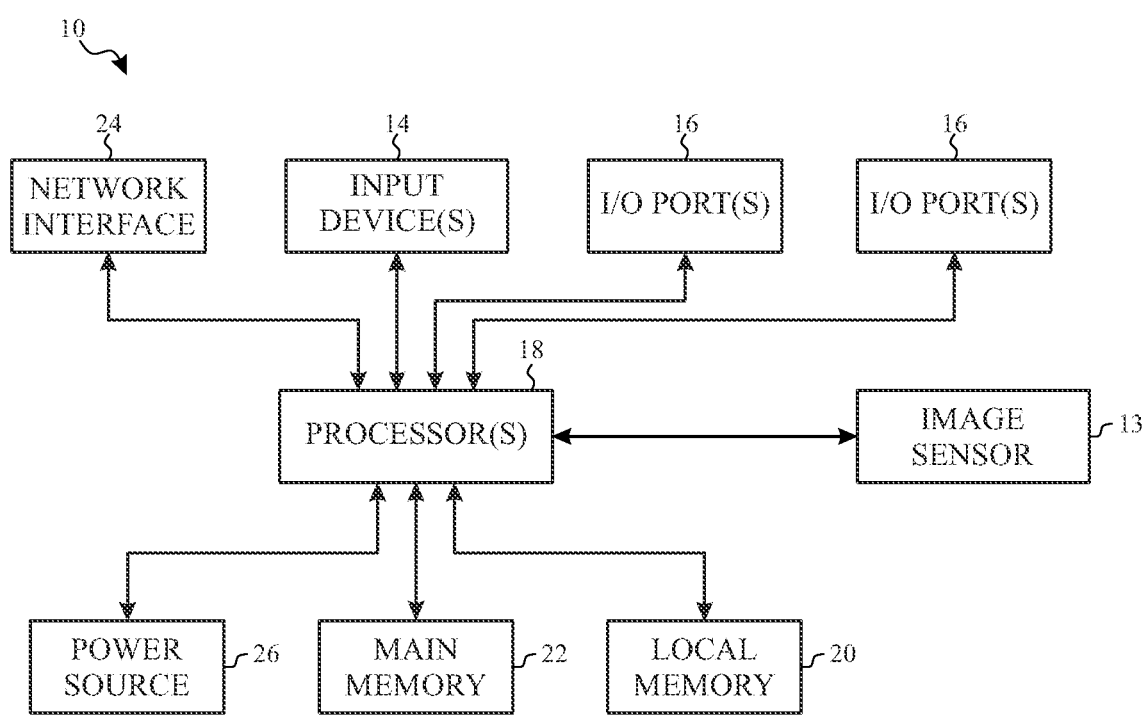
FIG. 1 is a block diagram of an electronic device, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To facilitate presenting a visual representation of information, an electronic display may display an image (e.g., image frame or picture) based on corresponding image data, which indicates target characteristics (e.g., luminance) of the image. For example, an electronic device may instruct the electronic display to display an image by communicating corresponding image data to the electronic display. Thus, in some instances, the image data may be stored in the electronic device, for example, in memory. Additionally, in some instances, the image data may be generated externally, for example, by another electronic device, such as a digital camera. Thus, the image data may be transmitted to the electronic device, for example, via a communication network or a communication bus.

To facilitate reducing resource usage, image data may be encoded (e.g., compressed) to reduce size (e.g., number of bits), which, for example, may facilitate reducing transmission bandwidth usage and/or memory storage usage. In some embodiments, a video encoding pipeline may encode source (e.g., input) image data based at least in part on prediction techniques. For example, since image frames often change gradually, the video encoding pipeline may utilize intra prediction techniques to encode source image data based on image data from the same image frame. Additionally, since successive image frames are often similar, the video encoding pipeline may utilize inter prediction techniques to encode source image data based on image data from one or more previous image frames and/or one or more subsequent image frames.

To facilitate encoding, in some embodiments, an image may be divided into one or more coding groups. As used herein, a "coding group" is intended to describe a sample (e.g., block) from an image that is encoded as a unit and, thus, may be a coding tree unit (CTU), a coding unit (CU), a macroblock, a slice, a picture, a Group of Pictures (GOP), or the like. In this manner, the image may be encoded by successively encoding source image data corresponding to each coding group in the image.

To prediction encode a coding group, a prediction sample (e.g., predictor), which indicates a prediction of source image data corresponding with the coding group, may be determined. For example, utilizing intra prediction techniques, the video encoding pipeline may determine a prediction sample for a coding group based on image data from the same image. Additionally, utilizing inter prediction techniques, the video encoding pipeline may determine a prediction sample for the coding group based on image data from one or more different (e.g., previously encoded) images.

Although conceptually similar, each prediction technique may include one or more prediction modes each associated with different encoding parameters. As such, different prediction modes may result in different prediction samples. For example, by implementing encoding parameters associated with a first intra prediction mode (e.g., vertical prediction mode), the video encoding pipeline may produce a prediction sample with each column set equal to image data corresponding with a pixel directly above the column. On the other hand, by implementing encoding parameters associated with a second intra prediction mode (e.g., DC prediction mode), the video encoding pipeline may produce a prediction sample set equal to an average of image data corresponding with neighboring (e.g., adjacent) pixels. Additionally, by implementing encoding parameters associated with a first inter prediction mode (e.g., first reference index and first motion vector), the video encoding pipeline may produce a prediction sample based on a reference sample at a first position within a first image frame. On the other hand, by implementing encoding parameters associated with a second inter prediction mode (e.g., second reference index and second motion vector), the video encoding pipeline may produce a prediction sample based on a reference sample at a second position within a second image frame.

To facilitate determining a prediction sample, in some embodiments, a coding group may be divided into one or more prediction groups. As used herein, a "prediction group" is intended to describe a sample from a coding group that is predicted as a unit and, thus, may be a prediction unit (PU) or the like. Thus, a prediction sample corresponding with a coding group may be determined by predicting each prediction group in the coding group based at least in part on a corresponding prediction mode. In some embodiments, a coding group may include a single prediction unit. In other embodiments, the coding group may be divided into multiple prediction units.

In any case, the source image data (e.g., a coding group) may be prediction encoded based at least in part on a corresponding prediction sample. For example, based on difference between the prediction sample and the source image data, the video encoding pipeline may determine a prediction residual. The prediction residual along with the encoding parameters implemented to determine the prediction residual may be transcoded and output as encoded image data.

Based at least in part on the encoded image data, a video decoding pipeline may determine corresponding decoded image data, for example, by implementing decoding parameters (e.g., determined based on encoding parameters indicated in the encoded image data), processing (e.g., FTQ/ITQ) the prediction residual, and applying the processed prediction residual. Thus, to facilitate encoding subsequent source image data, the video encoding pipeline may mirror expected operation of the video decoding pipeline to determine reconstructed image data, which indicates corresponding decoded image data expected to be determined by the video decoding pipeline. For example, the video encoding pipeline may process a prediction residual corresponding with a coding group by performing a forward transform and quantization (FTQ) followed by an inverse quantization and transform (ITQ).

To facilitate determining reconstructed image data, in some embodiments, an image may be divided into one or more transform groups. As using herein, a "transform group" is intended to describe a sample from an image that is transformed (e.g., forward transformed and/or inverse transformed) as a unit and, thus, may be a transform unit (TU) or the like. In this manner, reconstructed image data corresponding with a coding group may be determined by processing prediction residuals resulting in each transform group encompassed by the coding group. In some embodiments, a coding group may include a single transform group or multiple transform groups. In other embodiments, a transform group may span multiple coding groups.

As described above, the prediction sample and, thus, the encoded image data may vary based at least in part on encoding parameters implemented to generate the encoded image data. In particular, implementing different encoding parameters may result in determination of different prediction samples and, thus, varying degrees of matching between a coding group and each prediction sample. In some instances, the matching degree may affect encoding efficiency and/or decoding efficiency. For example, different matching degrees may result in varying encoded image data size (e.g., number of bits), encoding power consumption, encoding throughput (e.g., frame rate and/or bit rate), decoding power consumption, and/or decoding power throughput. Moreover, different matching degrees may result in varying video (e.g., image) quality when decoded image data is used to display a corresponding image.

Accordingly, the present disclosure provides techniques to facilitate improving video processing (e.g., encoding, decoding, and/or filtering), for example, by improving the degree that a prediction sample is expected to match corresponding source image data. To facilitate improving video encoding, in some embodiments, a video encoding pipeline may include a machine learning block that implements machine learning techniques, such as convolutional neural network (CNN) techniques. When enabled in the video encoding pipeline, the machine learning block may analyze input (e.g., source) image data to determine expected characteristics, such as texture, gradient, color, dynamic range, sharpness, motion, and/or edges, of a corresponding image, for example, by analyzing spatially relative to the same image and/or temporally relative to other images. Additionally, the machine learning block may indicate the expected characteristics, for example, via one or more feature metrics that indicate likelihood that specific characteristics are actually present.

To facilitate identifying characteristics of an image, a machine learning block may be trained to determine and implement machine learning parameters. For example, when the machine learning block implements convolutional neural network (CNN) techniques, the machine learning parameters may indicate number of convolution layers, interconnections between layers, and/or convolution weights (e.g., coefficients) corresponding to each convolution layer. In some embodiments, the machine learning block may be trained by recursively adjusting the machine learning parameters based at least in part on expected characteristics (e.g., indicated via one or more feature metrics) identified by processing (e.g., analyzing) training image data, for example, with known actual characteristics.

After training, the machine learning block may enable the video encoding pipeline to determine encoding parameters based at least in part on content analysis provided by the machine learning block. For example, when a prediction technique is to be implemented and the machine learning block is enabled, the video encoding pipeline may determine a prediction sample by down-sampling (e.g., source image data and/or prediction residuals), applying a forward transform and a forward quantization, applying an inverse quantization and an inverse transform, and upscaling. In some embodiments, the video encoding pipeline may down-scale and/or up-scale based on encoding parameters, for example, which indicate target aspect ratio, target filter (e.g., interpolation) weighting, and/or target filter mode. By leveraging the feature metrics determined by the machine learning block, the video encoding pipeline may adaptively adjust the encoding parameters used to determine the prediction sample.

In other words, utilizing the machine learning block, the video encoding pipeline may determine encoding parameters in a content dependent manner, which at least in some instances may facilitate improving the degree of matching between the prediction sample and the input image data (e.g., a coding group). As described above, in some embodiments, improving the matching degree may facilitate improving encoding efficiency, for example, by reducing number of bits included in encoded image data to indicate a prediction residual. Moreover, in some embodiments, improving the matching degree may facilitate improving video quality expected to result when the corresponding decoded image data is used to display an image on an electronic display.

To facilitate further improving video quality, decoded image data may be filtered before being used to display a corresponding image, for example, to reduce likelihood of the image being displayed with perceivable ringing, blocking, color fringing, and/or other visual artifacts. In some embodiments, the filter parameters may be determined by leveraging machine learning techniques, for example, using a machine learning block to obviate hand (e.g., trial and error) tuning of the filter parameters. As described above, a machine learning block may analyze image data to determine expected characteristics of a corresponding image. Accordingly, utilizing the machine learning block, the filter parameters to be applied to decoded image data may be adaptively adjusted in a content dependent manner, which at least in some instances may facilitate improving perceived video quality by reducing likelihood of displaying perceivable visual artifacts.

Determination of expected video quality may additionally or alternatively be improved by leveraging machine learning techniques. In some embodiments, expected video quality may be determined using a machine learning block, for example, implemented in the video encoding pipeline and/or the video decoding pipeline. To facilitate determining expected video quality, in some embodiments, the machine learning block may be trained based on training image data and corresponding actual video quality. For example, the machine learning block may be trained by adjusting its machine learning parameters such that expected video quality indicated by the machine learning block matches the actual video quality.

As described above, perceived video quality may also vary based at least in part on encoding parameters used to determine a prediction sample. Thus, to facilitate improving perceived video quality, implementing a machine learning block in the video encoding pipeline may facilitate adaptively adjusting the encoding parameters based at least in part on video quality expected to result from display based on corresponding decoded image data. Moreover, to facilitate improving encoding efficiency and/or decoding efficiency, implementing a machine learning block in the video encoding pipeline may facilitate adaptively adjusting the encoding parameters based at least in part on expected size of encoded image data, expected encoding power consumption, expected encoding throughput, expected decoding power consumption, and/or expected decoding throughput. In this manner, as will be described in more detail below, the techniques described in the present disclosure may facilitate improving video processing (e.g., encoding, decoding, filtering, and/or analysis) by one or more machine learning blocks to adaptively adjust image data processing in a content dependent manner.

To help illustrate, an electronic device 10, which may utilize an electronic display 12 to display images based on image data and/or an image sensor 13 to capture image data, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, the image sensor 13, one or more input devices 14, one or more input/output (I/O) ports 16, a processor core complex 18 having one or more processors or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

In any case, as depicted, the processor core complex 18 is operably coupled with local memory 20 and the main memory storage device 22. In some embodiments, the local memory 20 and/or the main memory storage device 22 may be tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and the like.

In some embodiments, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

Additionally, as depicted, the processor core complex 18 is operably coupled with the network interface 24. Using the network interface 24, the electronic device 10 may communicatively couple to a computing network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output encoded image data to the portable storage device and/or receive encoding image data from the portable storage device.

As depicted, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. Furthermore, as depicted, the processor core complex 18 is operably coupled with input devices 14, which may enable a user to interact with the electronic device 10. In some embodiments, the inputs devices 14 may include buttons, keyboards, mice, trackpads, and the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from another electronic device 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

As described above, image data may be encoded (e.g., compressed), for example, by the electronic device 10 that generated the image data to reduce number of memory addresses used to store and/or bandwidth used to transmit the image data. Once generated or received, the encoded image data may be stored in local memory 20 and/or the main memory storage device 22. Accordingly, to display image frames, the processor core complex 18 may retrieve encoded image data from memory, decode the encoded image data, and instruct the electronic display 12 to display image frames based on the decoded image data.

Figure 2:
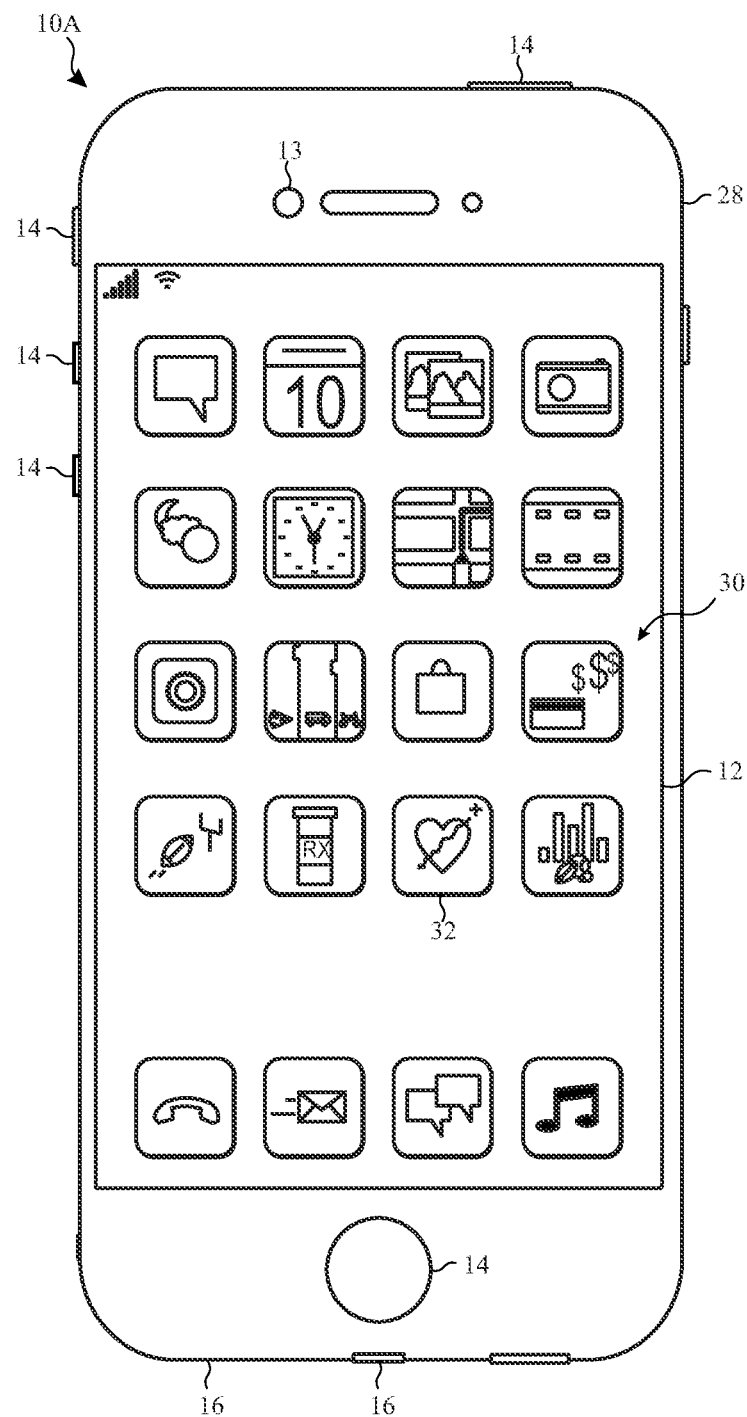
FIG. 2 is an example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
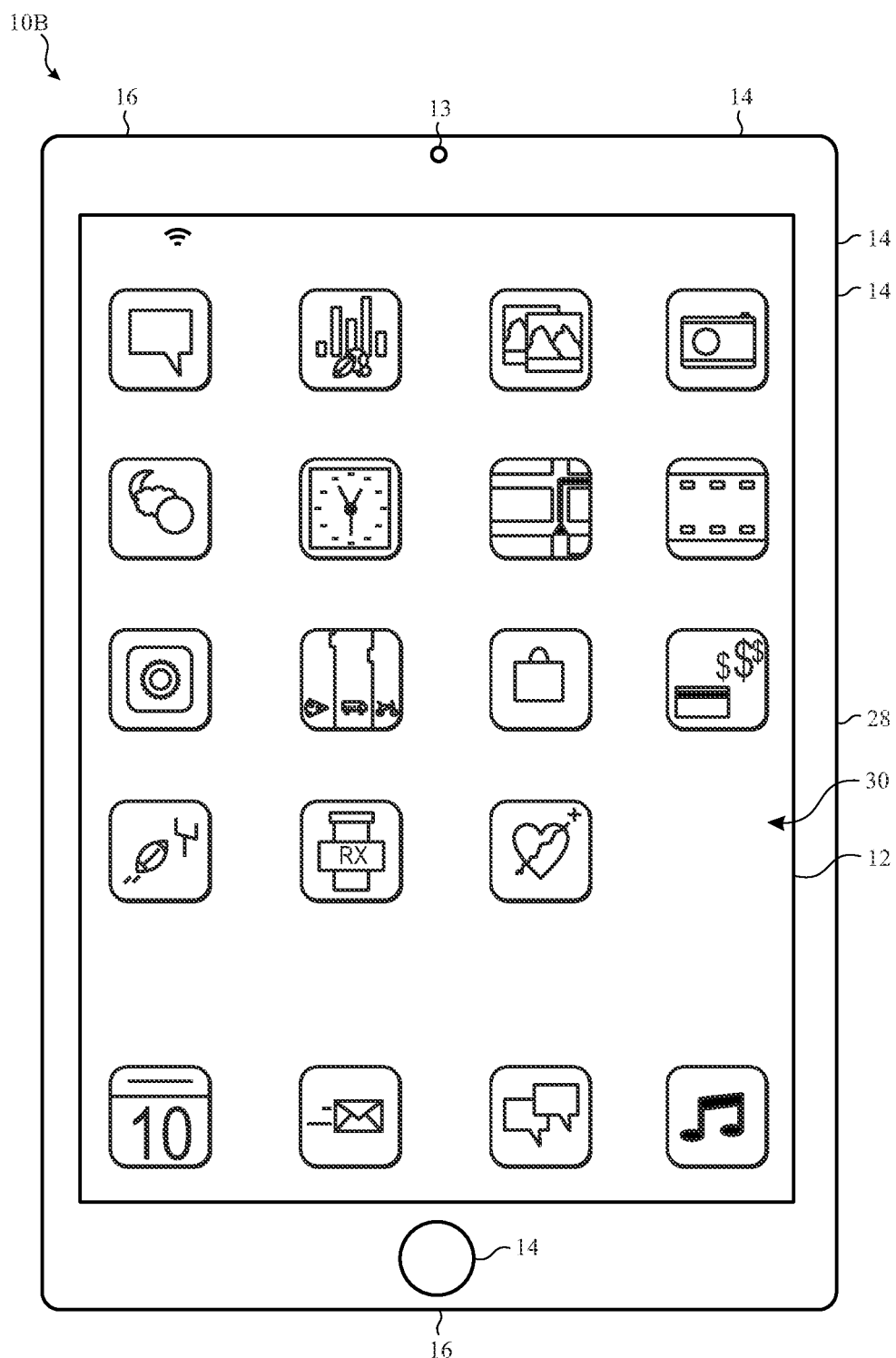
FIG. 3 is an example of the electronic device of FIG. 1, in accordance with an embodiment of the present disclosure.
Figure 4:
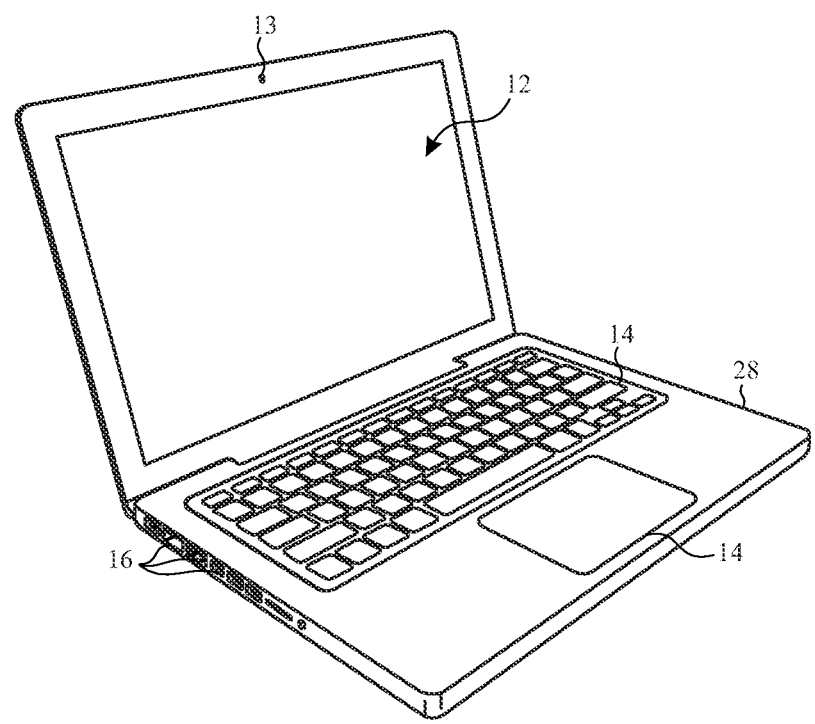
FIG. 4 is an example of the electronic device of FIG. 1, in accordance with an embodiment of the present disclosure.
Figure 5:
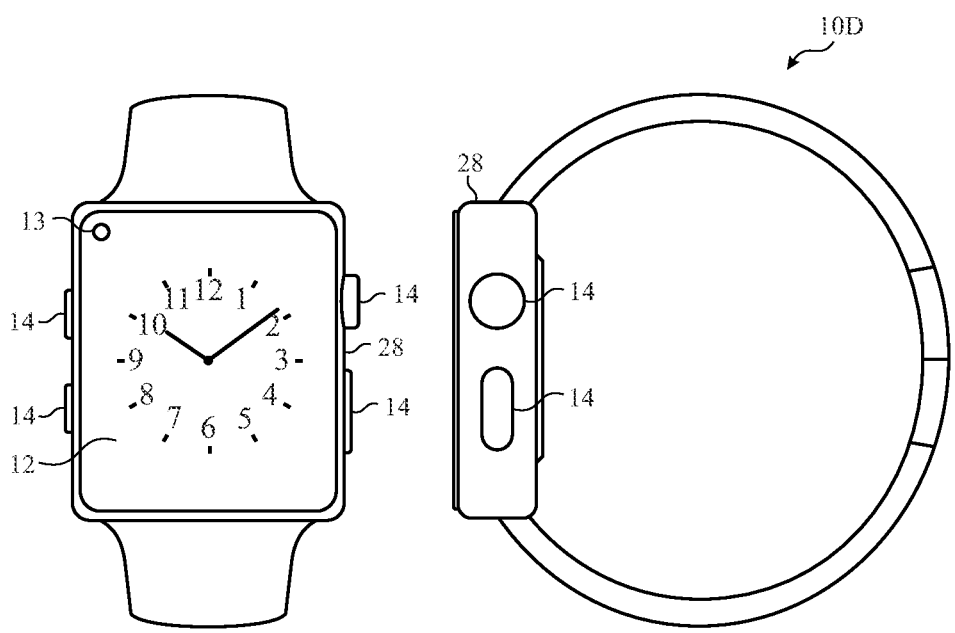
FIG. 5 is an example of the electronic device of FIG. 1, in accordance with an embodiment of the present disclosure.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, source (e.g., uncompressed or input) image data may be encoded (e.g., compressed) to reduce resource usage. In some embodiments, a video encoding pipeline may encode image data based at least in part on prediction techniques, such as inter prediction techniques and/or intra prediction techniques. To facilitate improving video encoding and/or video decoding, in some embodiments, the video encoding pipeline may leverage machine learning techniques, such as convolutional neural network (CNN) techniques.

Figure 6:
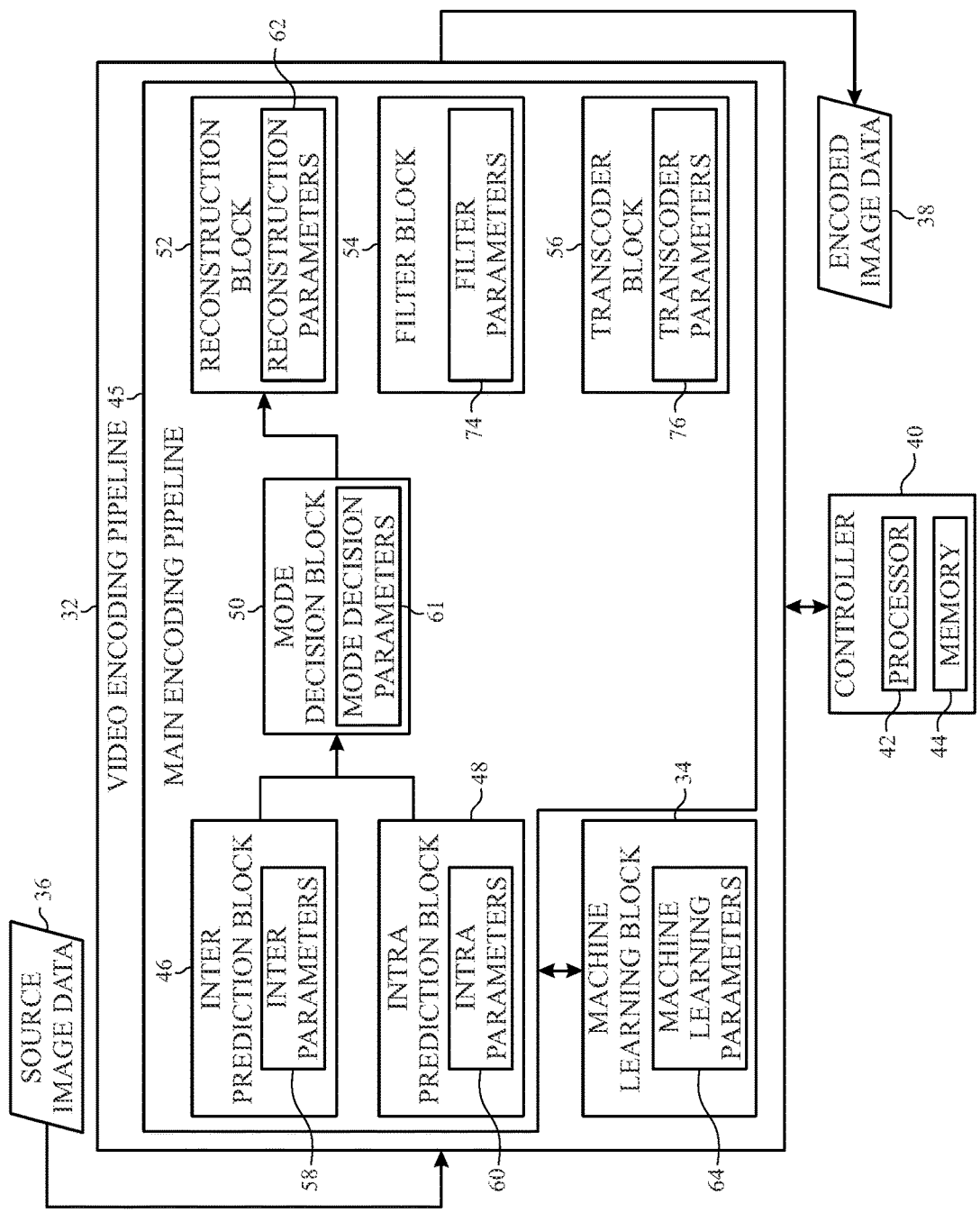
FIG. 6 is block diagram of a video encoding pipeline including a machine learning block, in accordance with an embodiment of the present disclosure.

To help illustrate, an example of a video encoding pipeline 32 including a machine learning block 34, which may implement machine learning techniques, is shown in FIG. 6. In operation, the video encoding pipeline 32 may receive source image data 36 and output encoded image data 38. In some embodiments, operation of the video encoding pipeline 32 may generally be controlled by a controller 40. Although depicted as a single controller 40, in other embodiments, one or more separate controllers 40 may be implemented to control operation of the video encoding pipeline 32.

To facilitate controlling operation, the controller 40 may include a controller processor 42 and controller memory 44. In some embodiments, the controller processor 42 may execute instructions and/or process data stored in the controller memory 44. In other embodiments, the controller processor 42 may be hardwired with instructions via circuitry, such as one or more logic gates. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display 12).

As described above, the video encoding pipeline 32 may receive source image data 36 from an image data source. In some embodiments, the image data source may include the image sensor 13 and/or any other suitable electronic device that generates or stores uncompressed (e.g., source) image data. Additionally, the video encoding pipeline 32 may output encoded image data 38 to an output device, for example, for storage and/or transmission. Thus, in some embodiments, the output device may include the local memory 20, the main memory storage device 22, the network interface 24, the I/O ports 16, the controller memory 44, and/or the like.

As described above, the video encoding pipeline 32 may operate on source image data 36 to generate encoded image data 38. To simplify discussion, the functions (e.g., operations) performed by the video encoding pipeline 32 are divided between various processing blocks (e.g., circuitry or modules). For example, in the depicted embodiment, the video encoding pipeline 32 includes the machine learning block 34, an inter prediction block 46, an intra prediction block 48, a mode decision block 50, a reconstruction block 52, a filter block 54, and a transcoder block 56.

It should be appreciated that the depicted video encoding pipeline 32 is merely intended to be illustrative and not limiting. For example, in some embodiments, the video encoding pipeline 32 may include additional blocks, such as a binarization block. Additionally, in some embodiments, functions performed by one processing block may be divided between multiple processing blocks. For example, the functions performed by the reconstruction block 52 may be implemented using a chroma reconstruction block and a luma reconstruction block.

To facilitate generating the encoded image data 38, one or more of the processing blocks may be pipelined. For example, in the depicted embodiment, the inter prediction block 46, the intra prediction block 48, the mode decision block 50, the reconstruction block 52, the filter block 54, and the transcoder block 56 are organized in a main encoding pipeline 45. To facilitate improving operational efficiency, in other embodiments, the video encoding pipeline 32 may be implemented using multiple parallel data processing pipelines. For example, the transcoder block 56 may instead by implemented in a transcoder pipeline separate from the main encoding pipeline 45.

To encode the source image data 36, the video encoding pipeline 32 may determine and implement encoding parameters to determine a corresponding prediction residual. In particular, the video encoding pipeline 32 may prediction encode source image data 36, for example, using the inter prediction block 46, the intra prediction block 48, the mode decision block 50, and/or the reconstruction block 52. More specifically, the intra prediction block 48 may determine one or more candidate intra prediction modes and implement associated intra parameters 60 to determine corresponding prediction samples. In other words, the intra parameters 60 may indicate operational parameters that the intra prediction block 48 implements to determine a prediction sample based at least in part on image data (e.g., reconstructed image data) corresponding with the same image as the source image data 36.

Additionally, the inter prediction block 48 may determine one or more candidate inter prediction modes (e.g., motion vector and reference index) and implement associated inter parameters 58 to determine corresponding prediction samples. In other words, the inter parameters 58 may indicate operational parameters that the inter prediction block 46 implements to determine a prediction sample based at least in part on image data (e.g., reconstructed image data) corresponding with a different image. Furthermore, the mode decision block 50 may either select one or more prediction modes from the candidate prediction modes or a skip mode, for example, based at least in part on corresponding rate-distortion metrics. In some embodiments, the mode decision block 50 may determine a rate-distortion metric based at least in part on a weighting factor (e.g., k) indicated by mode decision parameters 61.

When a prediction mode is selected, the reconstruction block 52 may determine a prediction residual, which indicates difference between the source image data 36 and a corresponding prediction sample. To facilitate prediction encoding subsequent source image data 36, the reconstruction block 52 may determine reconstructed image data, which indicates expected decoded image data, based at least in part on reconstruction parameters 62. For example, the reconstruction block 52 may perform a forward transform and quantization (FTQ) on the prediction residual, perform an inverse transform and quantization (ITQ) to determine a reconstructed prediction residual, and add the reconstructed prediction residual to the prediction sample to determine the reconstructed image data. In some embodiments, the reconstruction parameters 62 may indicate quantization coefficients implemented by the reconstruction block 52 to determine the reconstructed image data and/or organization of transform groups in a corresponding image.

To facilitate decoding the encoded image data 38, encoding parameters implemented by the video encoding pipeline 32 and the prediction residual may be indicated in the encoded image data 38. For example, such encoding parameters may include the inter parameters 58 when an inter prediction mode is selected, the intra parameters 60 when an intra prediction mode is selected, and/or the reconstruction parameters 62 when a prediction mode is selected.

As described above, to facilitate improving video quality, decoded image data may be filtered before being used to display an image. In some embodiments, the filter block 54 may determine filter parameters 74 expected to reduce likelihood of perceivable visual artifacts when applied to decoded image data. For example, the filter block 54 may determine filter parameters 74 expected to reduce likelihood of producing perceivable block artifacts. Additionally or alternatively, the filter block 54 may determine filter parameters 74 expected to reduce likelihood of producing other types of perceivable visual artifacts, such as color fringing artifacts and/or ringing artifacts. In some embodiments, filter parameters 74 expected to reduce likelihood of producing different types of perceivable visual artifacts may be determined in parallel.

When the filter block 54 is implemented in the video encoding pipeline 32, the filter parameters 74 may be communicated along with the encoded image data 38. As will be described in more detail below, in some embodiments, the filter block 54 may additionally or alternatively be implemented on the decoding side, for example, in a video decoding pipeline. In other words, in some embodiments, a filter block 54 may be implemented in loop to enable results of the filtering process to be used in subsequent processing, for example, by the video encoding pipeline 32 or a video decoding pipeline. Additionally or alternatively, a filter block 54 may be implemented out of loop, for example, as a pre-processing block (e.g., before the video encoding pipeline 32) or a post-processing block (e.g., after a video decoding pipeline). When implemented as a post-processing block, in some embodiments, video decoding may be performed relatively independent of the filtering process, for example, such that results of the filtering process are not used in the video decoding pipeline.

To facilitate further improving encoding efficiency, the transcoder block 56 may entropy encode the prediction residual, the encoding parameters, and/or the filter parameters 74 based at least in part on transcoder parameters 76. In some embodiments, the prediction residual, the encoding parameters, and/or the filter parameters 74 may be indicated using symbols (e.g., syntax elements). For example, a first syntax element may indicate a prediction parameter (e.g., inter parameter 58 or intra parameter 60) corresponding with a selected prediction mode, a second syntax element may indicate a quantization coefficient implemented by the reconstruction block 52, a third syntax element may indicate a filter parameter 74, and a fourth syntax element may indicate the prediction residual.

To facilitate entropy encoding, the symbols may be binarized, for example, via a binarization block. In some embodiments, a symbol may be binarized by mapping the symbol to a corresponding binary representation, which includes one or more bins (e.g., "0" or "1"). Additionally, in some embodiments, the binarization block may generate the binary representation using exp-golomb coding, fixed length coding, truncated unary coding, and/or truncated rice coding. By binarizing the symbols, the binarization block may generate a bin stream.

The transcoder block 56 may then convert the bin stream to a bit stream with one or more symbols represented by a fractional number of bits. In some embodiments, the transcoder block 56 may compress bins from the bin stream into bits using arithmetic coding techniques, such as context adaptive binary arithmetic coding (CABAC) and/or context-adaptive variable-length coding (CAVLC). To facilitate arithmetic coding, the transcoder parameters 76 may include a context model, which indicates probability that a bin is a "1" or a "0." Based on the probability of the bin, the transcoder block 56 may divide a range into two sub-ranges. The transcoder block 56 may then determine an encoded bit such that it falls within one of the two sub-ranges to select the actual value of the bin. In this manner, multiple bins may be represented by a single bit, thereby improving encoding efficiency (e.g., reduction in size of source image data). After entropy encoding, the transcoder block 56 may output the encoded image data 38.

In some embodiments, adjusting the encoding parameters, the filter parameters 74, and/or the transcoder parameters 76 may affect encoding efficiency of the video encoding pipeline 32, decoding efficiency, and/or expected video quality of corresponding decoded image data. For example, varying prediction parameters (e.g., intra parameters 60 and/or inter parameters 58) included in the encoding parameters may result in different degrees of matching between the source image data 36 and a corresponding prediction sample. As described above, different matching degrees may affect size of the encoded image data 38, throughput of the video encoding pipeline 32, power consumption attributed to the video encoding pipeline 32, throughput of a video decoding pipeline, power consumption attributed to a video decoding pipeline, and/or video quality when corresponding decoded image data is used to display an image.

To facilitate improving video encoding and/or video decoding, the video encoding pipeline 32 may leverage machine learning techniques implemented by the machine learning block 34. In some embodiments, the machine learning block 34 may be physically implemented in the electronic device 10. Additionally or alternatively, the machine learning block 34 may be implemented remotely, for example, in another electronic device or in the cloud. In such embodiments, the machine learning block 34 may be communicatively coupled to the electronic device 10 and, thus, the main encoding pipeline 45, for example, via the network interface 24.

The machine learning block 34 may implement machine learning parameters 64 to contextually analyze source image data 36, for example, compared with previously processed (e.g., analyzed or encoded) image data to determine expected characteristics of a corresponding image. Based at least in part on the characteristics, the video encoding pipeline 32 may adaptively adjust the encoding parameters in a content dependent manner, which at least in some instances may improve encoding efficiency, decoding efficiency, and/or resulting video quality of decoded image data. To facilitate contextually analyzed source image data 36, in some embodiments, the machine learning block 34 may implement convolutional neural network (CNN) techniques.

Figure 7:
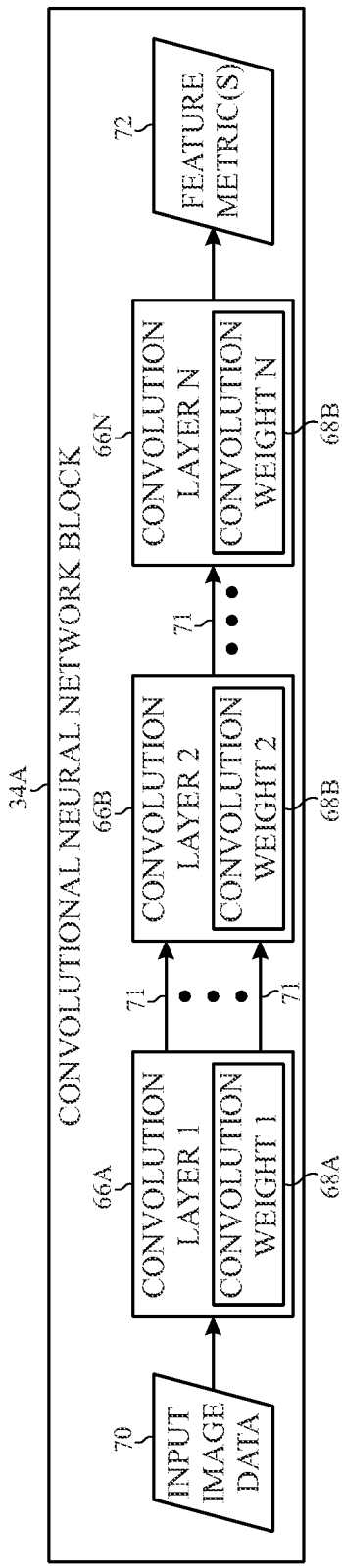
FIG. 7 is block diagram of an example of the machine learning block of FIG. 6, in accordance with an embodiment of the present disclosure.

To help illustrate, an example of a convolutional neural network block 34A, which may be implemented as a machine learning block 34, is shown in FIG. 7. Generally, the convolutional neural network block 34A includes one or more convolution layers 66, which each implements convolution weights 68, connected via layer interconnections 71. For example, in the depicted embodiment, the convolutional neural network block 34A includes a first convolution layer 66A that implements first convolution weights 68A, a second convolution layer 66B that implements second convolution weights 68B, and so. Additionally, outputs of the first convolution layer 66A may be connected to inputs of the second convolution layer 66B via one or more layer interconnections 71.

It should be appreciated that the depicted convolutional neural network block 34A is merely intended to be illustrative and not limiting. In particular, the machine learning parameters 64 of the convolutional neural network block 34A may be adjusted by adjusting the number of convolution layers 66, associated convolution weights 68, and/or configuration (e.g., number and/or interconnected nodes) of the layer interconnections 71. In other words, a convolutional neural network block 34A may include any suitable number of convolution layers 66, for example, one convolution layer 66, two convolution layers 66, or more. Additionally, in some embodiments, a convolutional neural network block 34A may include additional layers, such as one or more pooling layers (not depicted).

In the depicted example, the convolutional neural network block 34A may process input image data 70 to facilitate determining expected characteristics of a corresponding image. In some embodiments, the input image data 70 may include the source image data 36, encoded image data 38, reconstructed image data, and/or decoded image data. To facilitate identifying characteristics, the convolutional neural network block 34A may determine one or more feature metrics 72, for example, indicative of likelihood that specific characteristics (e.g., features) are present in the corresponding image.

In some embodiments, each convolution layer 66 may output one or more feature metrics 72. For example, the first convolution layer 66A may process the input image data 70 based at least in part on the first convolution weights 68A to determine a first feature metric 72 and communicate the first feature metric 72 to the second convolution layer 66B via a corresponding layer interconnection 71. Additionally, in some embodiments, successive convolution layer 66 may determine feature metrics 72 with varying degrees of abstraction. In this manner, subsequent (e.g., downstream) convolution layers 66 may leverage characteristics of the corresponding image determined by previous (e.g., upstream) convolution layers 66, for example, to determine characteristics on different levels of abstraction.

For example, the first convolution layer 66A may determine the first feature metric 72 to indicate likelihood that a curved edge is present in the corresponding image. By processing the first feature metric 72 and/or the input image data 70 based at least in part on the second convolution weights 68B, the second convolution layer 66B may leverage likelihood that a curved edge is present to determine a second feature metric 72, which indicates likelihood that a circle is present in the corresponding image. In a similar manner, subsequent (e.g., downstream) convolution layers 66 may leverage characteristics determined by previous (e.g., upstream) convolution layers 66 to facilitate determining more complex characteristics of the corresponding image. For example, the Nth convolution layer 66N may process feature metrics 72 determined by previous convolution layers 66 and/or the input image data 70 based at least in part on the Nth convolution weights 68N to determine an Nth feature metric 72, which indicates likelihood that a basketball is present in the corresponding image.

As will be described in more detail below, in some embodiments, a convolutional neural network block 34A may additionally or alternatively process other types of input data and/or generate other types of output data. For example, the convolutional neural network block 34A may directly determine a prediction sample based at least in part on source image data 36, previously determined encoded image data 38, and/or previously determined reconstructed image data. Additionally, the convolutional neural network block 34A may determine reduced resolution prediction residuals by processing prediction residuals determined using a base prediction technique. In any case, when a machine learning block 34 (e.g., convolutional neural network block 34A) outputs one or more of the feature metrics 72 indicative of expected image characteristics, the video encoding pipeline 32 may adaptively adjust the encoding parameters based at least in part on the one or more of the feature metrics 72.

For example, returning to FIG. 6, the video encoding pipeline 32 may adjust the inter parameters 58 and/or the intra parameters 60 implemented to determine a corresponding prediction sample based at least in part on the feature metrics 72. In some embodiments, the inter parameters 58 may indicate whether to determine the prediction sample by implementing base inter prediction techniques (e.g., motion estimation) or by processing (e.g., down-scale, FTQ, ITQ, and up-scale) image data corresponding to a different image using the machine learning block 34. Additionally, in some embodiments, the intra parameters 60 may indicate whether to determine the prediction sample by implementing base intra prediction techniques (e.g., image data interpolation techniques) or by processing (e.g., down-scale, FTQ, ITQ, and up-scale) image data corresponding to the same image using the machine learning block 34. In other words, in some embodiments, the machine learning block 34 may be selectively enabled and disabled.

When the machine learning block 34 is enabled, the inter parameters 58 and/or the intra parameters 60 may indicate encoding parameters with which to process image data. For example, the inter parameters 58 and/or the intra parameters 60 may indicate target aspect ratio, target filter weights (e.g., coefficients), and/or target filter mode (e.g., algorithm) with which to down-scale and/or up-scale the image data. Thus, by adjusting the inter parameters 58 and/or the intra parameters 60 based at least in part on feature metrics 72 determined by the machine learning block 34, the video encoding pipeline 32 may adaptively adjust determination of the prediction sample in a content dependent manner, which at least in some instances may facilitate improving encoding and/or decoding compared to the base prediction techniques.

Additionally or alternatively, the video encoding pipeline 32 may adjust the reconstruction parameters 62 based at least in part on feature metrics 72 determined by the machine learning block 34. In some embodiments, the reconstruction parameters 62 may indicate whether to implement base quantization coefficients or quantization coefficients determined based at least in part on feature metrics 72 output from the machine learning block 34. By adjusting the reconstruction parameters 62 based at least in part on the feature metrics 72, the video encoding pipeline 32 may adaptively adjust determination of the reconstructed image data in a content dependent manner, which at least in some instances may facilitate improving encoding and/or decoding compared to when the base quantization coefficients are implemented.

Similarly, the video encoding pipeline 32 may adjust the mode decision parameters 61 based at least in part on feature metrics 72 determined by the machine learning block 64. In some embodiments, the mode decision parameters 63 may indicate whether to implement a base mode decision weighting (e.g., k) or a mode decision weighting determined based at least in part on the feature metrics 72 output from the machine learning block 34. By adjusting the mode decision parameters 63 based at least in part on feature metrics 72, the video encoding pipeline 32 may adaptively adjust selection of encoding parameters, which at least in some instances may facilitate improving encoding and/or decoding compared to when the base mode decision weighting is implemented.

When machine learning techniques are utilized, the video encoding pipeline 32 may output the machine learning parameters 64 along with the encoded image data 38 to facilitate determination of corresponding decoded image data. In some embodiments, the machine learning parameters 64 may be explicitly indicated. To facilitate improving encoding efficiency, in other embodiments, the machine learning parameters 64 may be selected from predetermined sets of machine learning parameters 64. Thus, in such embodiments, the video encoding pipeline 32 may indicate the machine learning parameters 64 merely by identifying which of the predetermined sets is selected. In any case, by leveraging machine learning techniques, the video encoding pipeline 32 may determine the encoded image data 38 in a content dependent manner that facilitates improving encoding efficiency, decoding efficiency, and/or resulting video quality of corresponding decoded image data.

Figure 8:
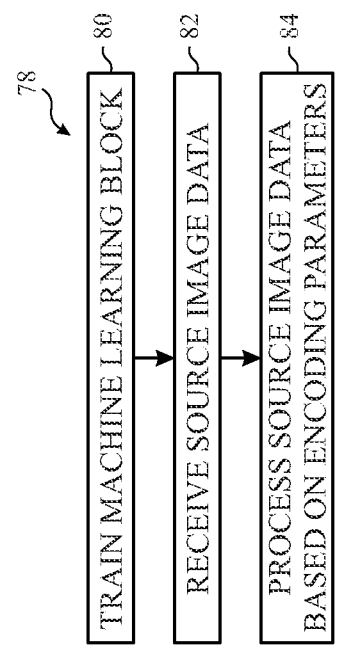
FIG. 8 is a flow diagram of a process for operating the video encoding pipeline of FIG. 6, in accordance with an embodiment of the present disclosure.

To help illustrate, one example of a process 78 for operating a video encoding pipeline 32 is described in FIG. 8. Generally, the process 78 includes training a machine learning block (process block 80), receiving source image data (process block 82), and processing the source image data based at least in part on encoding parameters (process block 84). In some embodiments, the process 78 may be implemented based on circuit connections formed in the video encoding pipeline 32. Additionally or alternatively, the process 78 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

In any case, the machine learning block 34 may be trained to implement machine learning parameters 64 expected to facilitate improving encoding efficiency, decoding efficiency, and/or resulting video quality (process block 80). For example, the machine learning block 34 may be trained such that, when the machine learning block 34 analyzes input image data 70 (e.g., source image data), the encoding parameters determined based on resulting feature metrics 72 are expected to improve matching between the source image data 36 and the prediction sample. Additionally or alternatively, the machine learning block 34 may be trained such that, when the machine learning block 34 analyzes input image data 70 (e.g., reconstructed image data), the filter parameters 74 determined based on resulting feature metrics 72 are expected to reduce likelihood of displaying perceivable visual artifacts.

Figure 9:
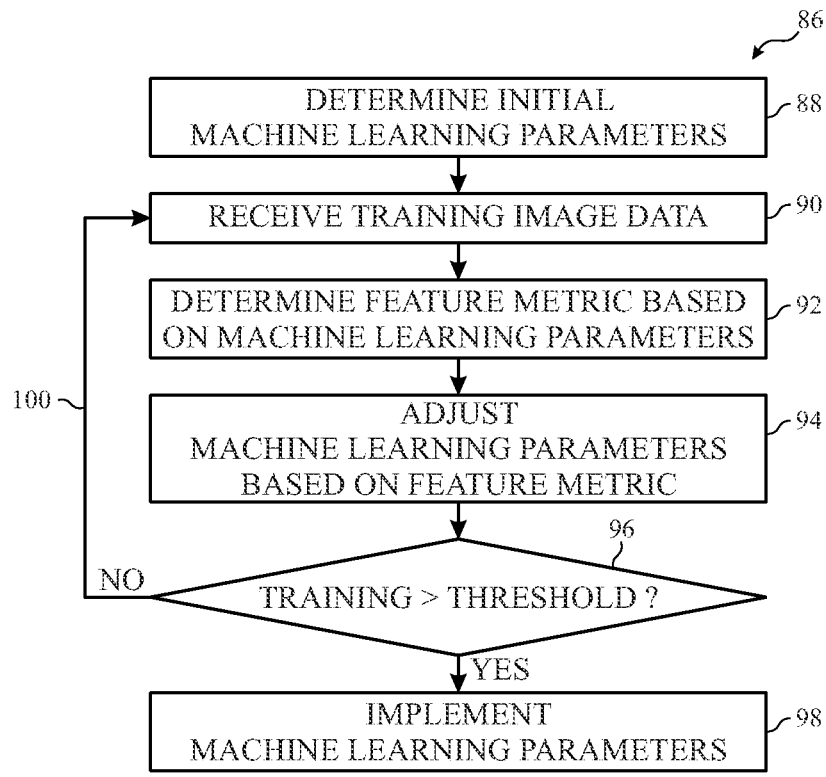
FIG. 9 is a flow diagram of a process for training the machine learning block in the video encoding pipeline of FIG. 6, in accordance with an embodiment of the present disclosure.

An example of a process 86 for training a machine learning block 34 is described in FIG. 9. Generally, the process 86 includes determining initial machine learning parameters (process block 88), receiving training image data (process block 90), determining a feature metric based on machine learning parameters (process block 92), adjusting the machine learning parameters based at least in part on the feature metric (process block 94), determining whether the number of times a machine learning block has been trained is greater than a threshold (decision block 96), and implementing the machine learning parameters in the machine learning block when the number of times the machine learning block has been trained is greater than the threshold (process block 98).

In some embodiments, the process 86 may be implemented by a training device, for example, by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like. Moreover, in some embodiments, the process 86 may be implemented off-line, for example, by a manufacture. Additionally or alternatively, the process 86 may be implemented on-line, for example, in the video encoding pipeline 32 and/or a video decoding pipeline.

In any case, the machine learning block 34 may be initialized with machine learning parameters 64 (process block 88). In some embodiments, the machine learning parameters 64 used to initialize the machine learning block 34 may be predetermined, for example, selected from the predetermined sets of machine learning parameters 64. Additionally or alternatively, the machine learning parameters 64 used to initialize the machine learning block 34 may be default (e.g., base) machine learning parameters 64.

After initialization, training image data may be input to the machine learning block 34 (process block 90). As will be described in more detail below, the machine learning block 34 may be recursively trained based on training image data. In some embodiments, the machine learning block 34 may receive the training image data from an image data source, such as the processor core complex 18, the main memory storage device 22, the local memory 20, the image sensor 13, and/or another (e.g., adversarial) machine learning block. Additionally, in some embodiments, the training image data may be predetermined and stored, for example, in a database or in the cloud.

By processing the training image data based on the machine learning parameters 64, the machine learning block 34 may determine one or more feature metrics 72 (process block 92). As described above, a feature metric 72 may be indicative of expected characteristics of a corresponding image, for example, by indicating likelihood that a specific characteristics is present. Thus, by processing the training image data, the machine learning block 34 may determine feature metrics 72 indicative of expected characteristics of an image corresponding with the training image data.

Based at least in part on feature metrics 72, the machine learning parameters 64 may be adjusted (process block 94). Since indicative of expected image characteristics, adjusting the machine learning parameters 64 based on the feature metrics 72 may enable adjusting in a content dependent manner that facilitates improving accuracy of identified characteristics and, thus, encoding efficiency, decoding efficiency, and/or resulting video quality. To facilitate adjusting the machine learning parameters 64, in some embodiments, actual characteristics of an image may be predetermined and, for example, received along with corresponding training image data. In such embodiments, the machine learning parameters 64 may be adjusted when an expected characteristic indicated by the feature metrics 72 differs (e.g., via a mean-squared error metric) from a corresponding actual characteristic, for example, by more than a threshold.

Additionally or alternatively, the machine learning parameters 64 may be adjusted such that processing subsequent image data with the machine learning block 34 identifies characteristics of corresponding images with improved accuracy, for example, by reducing likelihood that the machine learning block 34 identifies a false positive. In some embodiments, an adversarial machine learning block separate from the machine learning block 34 being trained may generate training image data, which if selected will result in a false positive (e.g., improved coding efficiency, but reduced image quality). By adjusting based on the training image data, the machine learning parameters 64 may be adjusted such that likelihood of the machine learning block 34 identifying a false positive is reduced.

As described above, the machine learning block 34 may be recursively trained, for example, such that the adversarial machine learning block and the machine learning block 34 being trained converge on machine learning parameters 34 that achieve a target balance between various factors (e.g., coding efficiency vs. image quality). To facilitate determining when the recursive training is completed, the number of times the machine learning block 34 has processed training image data may be tracked. Additionally, the number of times the machine learning block 34 has processed training image data may be compared with a training threshold, which indicates the number of times the machine learning block 34 is expected to be recursively trained (decision block 96).

When not greater than the training threshold, the machine learning block 34 may continue to be recursively trained (arrow 100). On the other hand, when greater than the training threshold, the machine learning parameters 64 may be implemented in the machine learning block 34 (process block 98). For example, when implementing convolutional neural network techniques, the machine learning block 34 (e.g., convolutional neural network block 34A) may implement the convolution layers 66, the convolution weights 68, and/or the layer interconnections 71 in accordance with the machine learning parameters 64.

As described above, in some embodiments, a machine learning block 34 may additionally or alternatively process other types of input data and/or generate other types of output data. Thus, in such embodiments, the machine learning block 34 may be trained using other types of input data and/or other types of output data. For example, when a machine learning block 34 is to be implemented to directly determine a prediction sample, the machine learning block 34 may be trained based at least in part on training image data and corresponding prediction samples. Additionally, when a machine learning block 34 is to be implemented to facilitate operating in a Reduced Resolution Update (RRU) mode, the machine learning block 34 may be trained based at least in part on training prediction residuals and corresponding reduced resolution prediction residuals. In any case, the machine learning block 34 may be trained by recursively adjusting the machine learning parameters 64.

Returning to the process 78 of FIG. 8, source image data 36 may be input to the video encoding pipeline 32 (process block 84). As described above, the video encoding pipeline 32 may receive source image data 36 from an image data source, such as the processor core complex 18, the main memory storage device 22, the local memory 20, and/or the image sensor 13. Additionally, to encode the source image data 36, the video encoding pipeline 32 may process the source image data 36 based at least in part on encoding parameters, for example, determined based at least in part on expected characteristics of a corresponding image indicated by feature metrics 72 output from the machine learning block 34.

Figure 10:
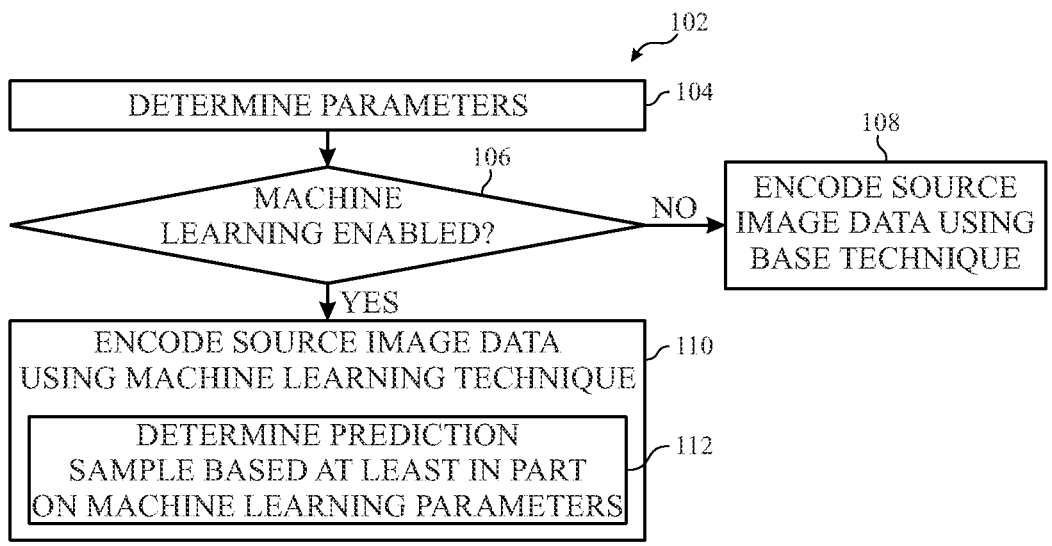
FIG. 10 is a flow diagram of a process for processing image data using the video encoding pipeline of FIG. 6, in accordance with an embodiment of the present disclosure.

To help illustrate, one embodiment of a process 102 for encoding source image data 36 is described in FIG. 10. Generally, the process 102 includes determining encoding parameters (process block 104), determining whether machine learning is enabled (decision block 106), encoding source image data using a base technique when machine learning is not enabled (process block 108), and encoding source image data using machine learning techniques when machine learning is enabled (process block 110). In some embodiments, the process 102 may be implemented based on circuit connections formed in the video encoding pipeline 32. Additionally or alternatively, the process 102 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

In any case, the video encoding pipeline 32 may determine encoding parameters to be implemented for encoding the source image data 36 (process block 104). In some embodiments, the encoding parameters may include inter parameters 58 to be implemented by the inter prediction block 46 and/or intra parameters 60 to be implemented by the intra prediction block 48. As described above, the inter parameters 58 and/or intra parameters 60 may indicate whether to implement machine learning techniques or base techniques.

Thus, based at least in part on the encoding parameters, the video encoding pipeline 32 may determine whether machine learning is enabled (decision block 106). When not enabled, the video encoding pipeline 32 may implement base techniques to encode the source image data 36. For example, when the inter parameters 58 indicate that machine learning is not enabled, the inter prediction block 46 may implement base inter prediction techniques (e.g., motion estimation and/or motion compensation) to determine a prediction sample. Additionally, when the intra parameters 60 indicate that machine learning is not enabled, the intra prediction block 48 may implement base intra prediction techniques (e.g., image data interpolation) to determine a prediction sample.

On the other hand, when machine learning is enabled, the video encoding pipeline 32 may encode the source image data 36 based at least in part on machine learning techniques (process block 110). To facilitate encoding the source image data 36, in some embodiments, the video encoding pipeline 32 may determine a prediction sample based at least in part on the machine learning parameters 64 (process block 112). In particular, as described above, the machine learning block 34 may process input data (e.g., source image data 36, reconstructed image data, and/or prediction residuals) based at least in part on the machine learning parameters 64 to determine expected characteristics of a corresponding image.

Figure 11:
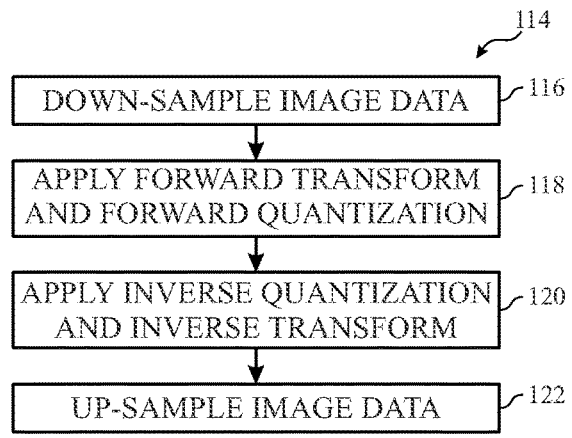
FIG. 11 is a flow diagram of a process for determining a prediction sample using the video encoding pipeline of FIG. 6, in accordance with an embodiment of the present disclosure.

To help illustrate, one example of a process 114 for determining a prediction sample using machine learning techniques is described in FIG. 11. Generally, the process 114 includes down-sampling image data (process block 116), applying a forward transform and a forward quantization (process block 118), applying an inverse quantization and an inverse transform (process block 120), and up-sampling image data (process block 122). In some embodiments, the process 114 may be implemented based on circuit connections formed in the video encoding pipeline 32. Additionally or alternatively, the process 114 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

In any case, the video encoding pipeline 32 may down-sample image data (process block 116). In some embodiments, the video encoding pipeline 32 may down-sample the source image data 36, for example, corresponding with a portion of an image or the whole image. Additionally, in some embodiments, the video encoding pipeline 32 may down-sample image data based at least in part on down-sampling parameters (e.g., a target down-sampling aspect ratio and/or a target down-sampling filter technique) included in the encoding parameters (e.g., inter parameters 58 and/or intra parameters 60).

To leverage machine learning techniques, the machine learning block 34 may process the source image data 36 to determine feature metrics 72 indicative of expected characteristics in a corresponding image. Based at least in part on the resulting feature metrics 72, the video encoding pipeline 32 may adaptively adjust the down-sampling (e.g., filter) parameters. By determining the down-sampling parameters in this manner, the video encoding pipeline 32 may determine down-sampled image data based at least in part on expected content of an image corresponding with the source image data 36.

Additionally, the video encoding pipeline 32 may apply a forward transform and a forward quantization to the down-sampled image data (process block 118). In some embodiments, the video encoding pipeline 32 may apply the forward transform based at least in part on organization of transform groups in the corresponding image, for example, indicated by the reconstruction parameters 62. Additionally, in some embodiments, the video encoding pipeline 32 may apply the forward quantization based at least in part on quantization coefficients, for example, indicated by the reconstruction parameters 62.

Furthermore, the video encoding pipeline 32 may apply an inverse transform and an inverse quantization to determine reconstructed down-sampled image data (process block 120). In some embodiments, the video encoding pipeline 32 may apply the inverse quantization by performing the inverse of the forward quantization. Thus, the video encoding pipeline 32 may apply the inverse quantization based at least in part on the quantization coefficients. Additionally, in some embodiments, the video encoding pipeline 32 may apply the inverse transform by performing the inverse of the forward transform.

By up-scaling the reconstructed down-sampled image data, the video encoding pipeline 32 may determine a prediction sample to be used to encode the source image data 36 and/or other image data corresponding with the same image frame (process block 122). In some embodiments, the video encoding pipeline 32 may up-sample based at least in part on up-sampling parameters (e.g., a target up-sampling aspect ratio and/or a target up-sampling filter technique). Additionally, in some embodiments, the video encoding pipeline 32 may up-sample to perform the inverse of the down-sampling and, thus, the up-sampling parameters may be determined based on the down-sampling parameters, which, as described above, are determined using machine-learning techniques. By determining the up-sampling parameters in this manner, the video encoding pipeline 32 may determine the prediction sample based at least in part on expected content of an image corresponding with the source image data 36.

Additionally or alternatively, the machine learning block 34 may directly determine a prediction sample based at least in part on the source image data 36, previously determined encoded image data 38, and/or previously determined reconstructed image data. In other words, in some embodiments, the machine learning block 34 may determine the prediction sample by processing (e.g., analyzing) full resolution image data. To determine a prediction sample for a prediction group, the machine learning block 34 may analyze image data corresponding to one or more pixel windows (e.g., around the current prediction group to determine an intra prediction sample or in different images to determine an inter prediction sample) relative to the current prediction group.

In other words, the machine learning block 34 may spatially and/or temporally analyze content in a pixel window relative to the current prediction group to determine similar features and determine the prediction sample for the current prediction group accordingly. For example, to determine an intra prediction sample for a current prediction group, a pixel window that includes one or more left neighboring columns and one or more top neighboring rows from the same image may be input to the machine learning block 34, thereby enabling the machine learning block 34 to determine content spatially neighboring the current prediction group. Based at least in part on the spatially related content, the machine learning block 34 may determine the intra prediction sample by painting in expected content of the current prediction group. Additionally, to determine an inter prediction sample for a current prediction group, one or more pixel windows from different images may be input to the machine learning block 34, thereby enabling the machine learning block 34 to determine content temporally related to the current prediction group.

In fact, by leveraging machine learning techniques, the machine learning block 34 may expand the analyzed window compared to base prediction techniques. For example, to determine an intra prediction sample, the machine learning block 34 may analyze image data corresponding to coding groups not directly adjacent a current coding group (e.g., encompassing the current prediction group). Additionally, to determine an inter prediction sample, the machine learning block 34 may analyze image data corresponding to images separated from a current image (e.g., encompassing the current prediction group) by one or more other images.

Moreover, in some embodiments, the machine learning block 34 may expand the analyzed window to include both temporally related pixel windows and spatially related pixel windows to facilitate determining a prediction sample for a current prediction group in a hybrid intra/inter manner. For example, in addition to image data corresponding with a temporally related pixel window, image data corresponding with one or more spatially related pixel windows (e.g., neighbor current prediction group in same image) may be input to the machine learning block 34. Additionally or alternatively, encoding parameters (e.g., motion vectors and/or weighting parameters) implemented by the video encoding pipeline 32 to encode the one or more spatially related pixel windows may be input to the machine learning block 34. Based on analysis of such spatially related data, the machine learning block 34 may improve determination of temporal relationships relative to the current prediction group. By analyzing an expanded window, likelihood that the machine learning block 34 identifies similar characteristics may be improved, which at least in some instances may facilitate improving video encoding, for example, by improving the degree of matching between the prediction sample and corresponding source image data 36.

In any case, as described above, to encode the source image data 36, the video encoding pipeline 32 may determine a prediction residual that indicates difference between the prediction sample and the source image data 36. Additionally, the video encoding pipeline 32 may indicate the prediction residual and/or encoding parameters (e.g., quantization coefficients, reference index, and/or a selected prediction mode) in the encoded image data 38. To facilitate improving encoding efficiency, in some embodiments, the video encoding pipeline 32 may indicate reduced resolution prediction residuals in the encoded image data 38 instead of full resolution prediction residuals, for example, when operating in a Reduced Resolution Update (RRU) mode. In such embodiments, the video encoding pipeline 32 may leverage machine learning techniques to generate reduced resolution prediction residuals, for example, by down-sampling full resolution prediction residuals in a content dependent manner via the machine learning block 34.

As described above, to facilitate display of a corresponding image, encoded image data 38 may be decoded, for example, by a video decoding pipeline. In particular, when encoded image data 38 is received, a video decoding pipeline may operate based at least in part on the prediction residual and/or encoding parameters indicated in the encoded image data 38 to determine corresponding decoded image data, which may then be used to display a corresponding image. To facilitate improving video encoding and/or video decoding, the video decoding pipeline may also leverage machine learning techniques.

Figure 12:
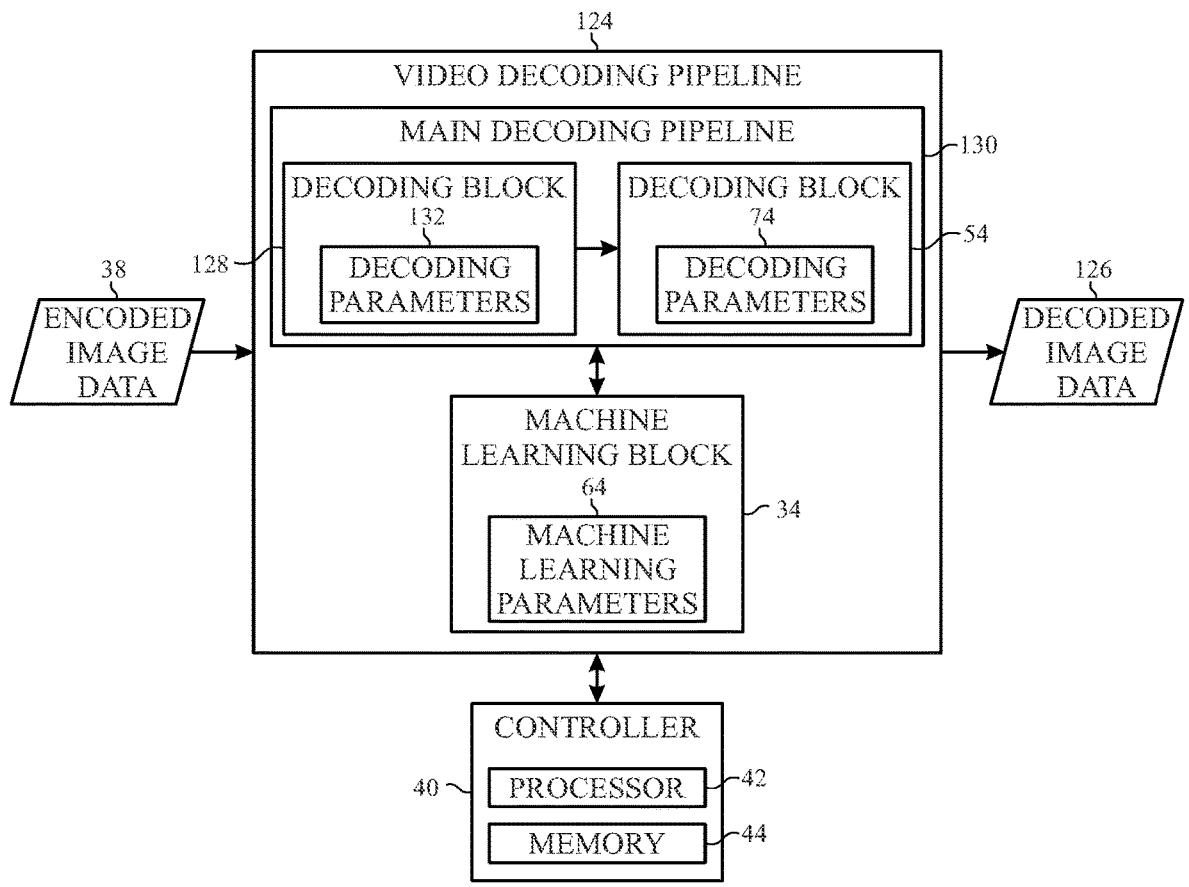
FIG. 12 is a block diagram of a video decoding pipeline including a machine learning block, in accordance with an embodiment of the present disclosure.

To help illustrate, an example of a video decoding pipeline 124 including a machine learning block 34, which may implement machine learning techniques, is shown in FIG. 12. In operation, the video decoding pipeline 124 may process encoded image data 38 and output decoded image data 126. In some embodiments, operation of the video decoding pipeline 124 may generally be controlled by a controller 40. Although depicted as a single controller 40, in other embodiments, one or more separate controllers 40 may be implemented to control operation of the video decoding pipeline 124.

In any case, the video decoding pipeline 124 may receive encoded image data 38 generated by a video encoding pipeline 32, for example, via the main memory storage device 22, the network interface 24, the I/O ports 16, the controller memory 44, and/or the like. Additionally, the video encoding pipeline 32 may output encoded image data 38 to an output device, for example, for storage and/or display. Thus, in some embodiments, the output device may include the local memory 20, the main memory storage device 22, the electronic display 12, and/or the like.

As described above, the video decoding pipeline 124 may operate on encoded image data 38 to generate decoded image data 126. To simplify discussion, the functions (e.g., operations) performed by the video decoding pipeline 124 are divided between various processing blocks (e.g., circuitry or modules). For example, in the depicted embodiment, the video encoding pipeline 32 includes the machine learning block 34 as well as a decoding block 128 and the filter block 54 organized in a main decoding pipeline 130.

It should be appreciated that the depicted video encoding pipeline 32 is merely intended to be illustrative and not limiting. In some embodiments, the machine learning block 34 may be physically implemented in the electronic device 10. Additionally or alternatively, in some embodiments the machine learning block 34 may be implemented remotely, for example, in another electronic device or the cloud.

In any case, to decode the encoded image data 38, the video decoding pipeline 124 may implement decoding parameters 132. In some embodiments, the video decoding pipeline 124 may decode the encoded image data 38 by reversing the operations performed by the video encoding pipeline 32. Thus, video decoding pipeline 124 may determine the decoding parameters 132 based at least in part on the encoding parameters indicated with the encoded image data 38. Based at least in part on the decoding parameters 132 and/or the prediction residual indicated by the encoded image data 38, the video decoding pipeline 124 may process the encoded image data 38 to determine decoded image data 126.

As described above, the video decoding pipeline 124 may leverage machine learning techniques to facilitate determining the decoded image data 126 in a content dependent manner. For example, in a similar manner as a filter block 54 implemented in the video encoding pipeline 32, the filter block 54 in the video decoding pipeline 124 may determine filter parameters 74 expected to improve video quality based at least in part on expected characteristics of a corresponding image identified by the machine learning block 34. Additionally or alternatively, when a filter block 54 implemented in the video encoding pipeline 32, the video decoding pipeline 124 may receive the filter parameters 74 along with the encoded image data 38 and filter the decoded image data 126 accordingly.

When machine learning blocks 34 are implemented in both the video encoding pipeline 32 and the video decoding pipeline 124, the video decoding pipeline 124 may receive the machine learning parameters 64 implemented in the video encoding pipeline 32 along with the encoded image data 38. In this manner, the video decoding pipeline 124 may implement the machine learning parameters 64 in the machine learning block 34 to enable the video decoding pipeline 124 to determine expected characteristics of a corresponding image, for example, without separately being trained. In some embodiments, to facilitate improving encoding efficiency, the machine learning parameters 64 may be determined by identifying one of multiple predetermined sets of machine learning parameters 64. In any case, the video decoding pipeline 124 may operate based at least in part on the decoding parameters 132 and/or the filter parameters 74 to determine the decoded image data 126.

Figure 13:
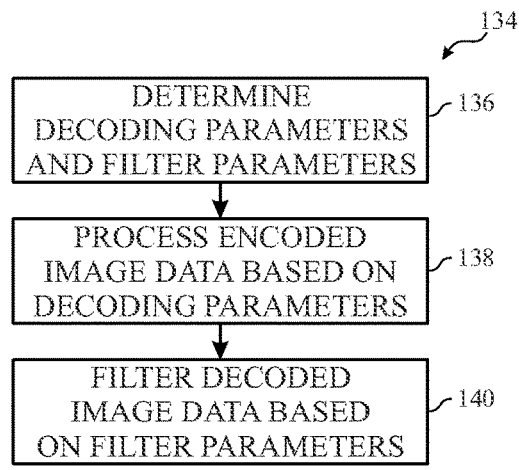
FIG. 13 is a flow diagram of a process for operating the video decoding pipeline of FIG. 12, in accordance with an embodiment of the present disclosure.

To help illustrate, one embodiment of a process 134 for operating the video decoding pipeline 124 is described in FIG. 13. Generally, the process 134 includes determining decoding parameters and filter parameters (process block 136), processing encoded image data based at least in part on the decoding parameters (process block 138), and filtering decoding image data based at least in part on the filter parameters (process block 140). In some embodiments, the process 134 may be implemented based on circuit connections formed in the video encoding pipeline 32. Additionally or alternatively, the process 134 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

In any case, the video decoding pipeline 124 may determine the decoding parameters 132 and/or the filter parameters 74 (process block 136). As described above, the video decoding pipeline 124 may determine the decoding parameters 132 based at least in part on encoding parameters indicated along with the encoded image data 38. When a filter block 54 is implemented in the video encoding pipeline 32, the video decoding pipeline 124 may receive the filter parameters 74 along with the encoded image data 38. Additionally or alternatively, the video decoding pipeline 124 may determine the filter parameters 74, for example, based at least in part on expected characteristics of a corresponding image identified by the machine learning block 34.

Based on the decoding parameters 132, the video decoding pipeline 124 may process the encoded image data 38 to determine decoded image data 126 (process block 138). In some embodiments, the video decoding pipeline 124 may implement the decoding parameters 132 based at least in part on previously decoded image data 126 to re-determine a prediction sample. As described above, in some embodiments, the encoded image data 38 may indicate a reduced resolution prediction residual to facilitate improving encoding efficiency. Thus, in such embodiments, the video decoding pipeline 124 may determine the prediction sample by up-scaling the reduced resolution prediction residual to full resolution.

Additionally, the video decoding pipeline 124 may determine and process the prediction residual indicated by the encoded image data 38, for example, by applying a forward transform, a forward quantization, an inverse quantization, an inverse transform, or any combination thereof. After processing the prediction residual, the video decoding pipeline 124 may apply the prediction residual to the prediction sample to determine the decoded image data 126. Additionally or alternatively, the machine learning block 34 in the video decoding pipeline 124 may determine the prediction sample and/or the prediction residual directly from the quantization coefficients indicated by the encoded image data 38.

To facilitate improving perceived video quality, before outputting the decoded image data 126, the video decoding pipeline 124 may filter the decoded image data 126 based at least in part on the filter parameters 74 (process block 140). As described above, the filter parameters 74 may be determined such that they are expected to reduce likelihood of producing perceivable visual artifacts (e.g., color fringing, ringing, and/or block). After filtering, the decoded image data 126 may be output, for example, to an electronic display 12 to facilitate displaying the corresponding image.

As described above, to facilitate improving video quality, video encoding and/or video decoding may be adaptively adjusted in a content dependent manner based at least in part on video quality of decoded image data 126 expected to be output from the video decoding pipeline 124. In some embodiments, the expected video quality may also be determined by leveraging machine learning techniques. As such, the expected video quality may be determined in a content dependent manner, which at least in some instances may improve accuracy of the expected video quality compared to the actual video quality when decoded image data 126 is used to display an image.

Figure 14:
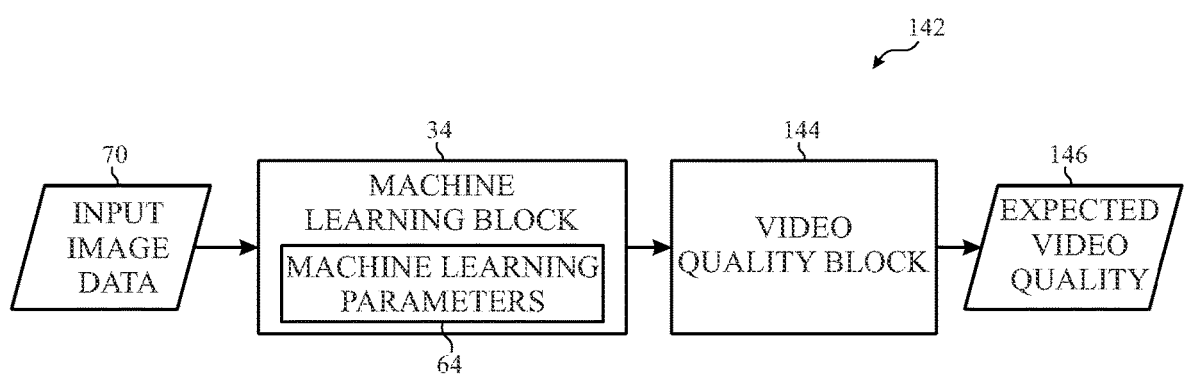
FIG. 14 is a block diagram of a video quality pipeline including a machine learning block, in accordance with an embodiment of the present disclosure.

To help illustrate, an example of a pipeline 142 including a video quality block 144 and a machine learning block 34, which may implement machine learning techniques, is shown in FIG. 14. Since encoding parameters may be determined using machine learning techniques, in some embodiments, the pipeline 142 may be included in a video encoding pipeline 32, for example, in the main encoding pipeline 45 or parallel to the main encoding pipeline 45. Additionally or alternatively, since filter parameters 74 may be determined using machine learning techniques, in some embodiments, the pipeline 142 may be included in a video decoding pipeline 124, for example, in the main decoding pipeline 130 or parallel to the main decoding pipeline 130.

In any case, the pipeline 142 may process (e.g., analyze) input image data 70 to determine an indication of expected video quality 146 of corresponding decoded image data 126. In particular, the machine learning block 34 may process the input image data 70 based at least in part on machine learning parameters 64 to determine expected characteristics of a corresponding image, for example, indicated via one or more feature metrics 72. Based at least in part on expected characteristics, the video quality block 144 may determine expected video quality 146 when decoded image data 126 corresponding with the input image data 70 is used to display an image.

Figure 15:
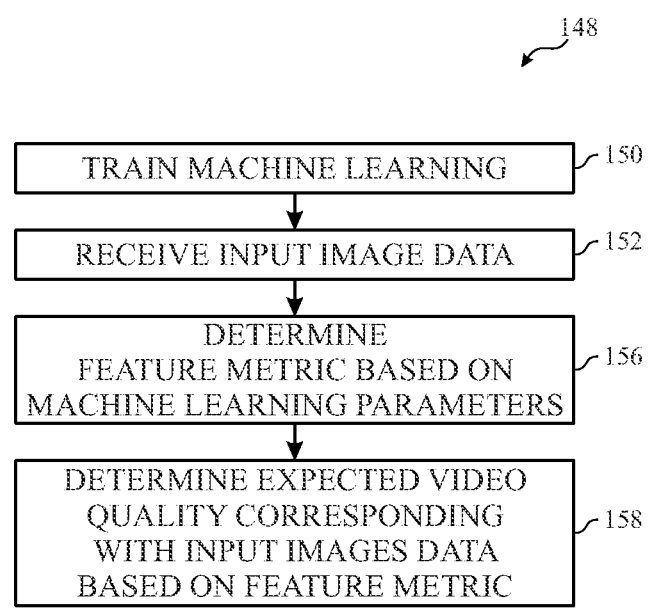
FIG. 15 is a flow diagram of a process for operating the video quality pipeline of FIG. 14, in accordance with an embodiment of the present disclosure.

One embodiment of a process 148 for operating a pipeline 142 to determine expected video quality 146 is described in FIG. 15. Generally, the process 148 includes training a machine learning block (process block 150), receiving input image data (process block 152), determining a feature metric based on machine learning parameters (process block 156), and determining expected video quality corresponding with the input image data based on the feature metric (process block 158). In some embodiments, the process 148 may be implemented based on circuit connections formed in the video encoding pipeline 32 and/or the video decoding pipeline 124. Additionally or alternatively, the process 148 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

In any case, the machine learning block 34 may be trained to determine and implement machine learning parameters 64 (process block 150). In some embodiments, the machine learning block 34 may be trained offline, for example, by implementing the process 86 of FIG. 9 based on training image data and actual video quality corresponding with the training image data. Additionally or alternatively, the machine learning block 34 may be trained online, for example, by feeding back actual video quality resulting from display of decoded image data 126.

Additionally, the machine learning block 34 may receive input image data 70 (process block 152). In some embodiments, the input image data 70 may be reconstructed image data previously determined by the reconstruction block 52. Thus, in such embodiments, the machine learning block 34 may receive the input image data 70 from an internal frame buffer or the video encoding pipeline 32. Additionally or alternatively, the input image data 70 may be source image data 36, encoded image data 38, and/or decoded image data 126. Thus, in some embodiments, the machine learning block 34 may receive the input image data 70 from an image data source, such as the processor core complex 18, the main memory storage device 22, the local memory 20, and/or the image sensor 13.

By processing the input image data 70 based at least in part on the machine learning parameters 64, the machine learning block 34 may indicate expected characteristics of a corresponding image, for example, by outputting one or more feature metrics 72 (process block 156). Based at least in part on the expected characteristics identified by the machine learning block 34, the video quality block 144 may determine expected video quality 146 when decoded image data 126 corresponding with the input image data 70 is used to display an image (process block 158). In some embodiments, a feature metric 72 determined by the machine learning block 34 may directly indicate the expected video quality 146. Additionally or alternatively, the video quality block 144 may interpret feature metrics 72 determined by the machine learning block 34, for example, to indicate the expected video quality 146 on a video quality scale (e.g., 1 to 10) and/or via a base metric, such as a peak signal-to-noise ratio (PSNR) metric and/or a mean squared error (MSE) metric. To facilitate reducing computational complexity, in some embodiments, the machine learning block 34 may directly process one or more base metrics associated with the input image data 70, for example, as an alternative to processing the input image data 70.

In any case, as described above, the video encoding pipeline 32 and/or the video decoding pipeline 124 may adaptively adjust operation in a content dependent manner to facilitate improving encoding efficiency, decoding efficiency, and/or resulting perceived video quality. Thus, to facilitate adaptively adjusting operation, the expected video quality 146 may be fed back to the machine learning block 34 or another machine learning block 34. As such, the technical effects of the present disclosure include improving video encoding and/or video decoding by leveraging machine learning techniques to adaptively adjust operation in content dependent manner. Moreover, the expected video quality 146 may be used to evaluate performance of a system (e.g., video encoding pipeline or video decoding pipeline), for example, by comparing with other systems.

FURTHER EXAMPLES

In some embodiments, the machine learning techniques described herein may be implemented for encoding intra coding groups, for example, in an inter slice. Additionally, determining a prediction sample using machine learning techniques may facilitate reducing computational complexity compared to motion compensation and/or improve scalability. In particular, convolutional neural networks may have lower complexity compared to base inter prediction techniques (e.g., motion compensation and/or motion estimation), for example, due to amount of data that is loaded to perform base inter prediction techniques. Additionally, in some embodiments, interpolation may be implemented for inter coding. In such embodiments, a convolutional neural network may be implemented to perform the interpolation.

With regard to scalability, a convolutional neural network may be implemented to scale image data from a lower resolution to a higher resolution. In some embodiments, this upscaling may be the final stage. Additionally or alternatively, this upscaling could just be used to generate a new reference, which is then used for subsequent prediction and coding in that context. Additionally, in some embodiments, the down-scaling/upscaling coding framework may be replaced by other concepts, such as reducing and/or expanding bit depth/dynamic range. For example, to facilitate expanding dynamic range of content indicated by image data, a convolutional neural network may be implemented to convert the image data to a higher bit depth.

In fact, in some embodiments, a machine learning system (e.g., block) may implement machine learning techniques to tone map content, for example, from a standard dynamic range (SDR) to a high dynamic range (HDR). As described above, machine learning techniques may be trained before deployment. Thus, to facilitate tone mapping content using machine learning techniques, the machine learning system may be trained based on SDR versions of previously graded content and corresponding HDR versions of the content.

Furthermore, in some embodiments, sets of machine learning parameters (e.g., models) may be associated with different types of content. For example, a first set may be associated with cartoons while a second set is associated with natural content (e.g., image of sky and/or grass) and a third set is associated with screen content. Moreover, in some embodiments, sets of machine learning parameters may be determined based on the position of the pixels that are being processed, for example, to facilitate accounting for different types of visual artifacts. Additionally, in some embodiments, sets of machine learning parameters may be associated with different color components (e.g., luma vs chroma). The sets of machine learning parameters may be described in different ways, for example, with varying complexity and/or accuracy.

To facilitate reducing complexity, in some embodiments, one color component may be processed using machine learning techniques while another color component is processed using base (e.g., non-machine learning) techniques. Moreover, in some embodiments, machine learning techniques may be implemented to determine characteristics of a color component by analyzing image data corresponding with the color component as well as previously encoded image data corresponding with other color components. For example, to determine characteristics of a chroma component, chroma image data as well as luma image data from previously encoded regions in the image (e.g., including luma image data from the current group) may be input and processed by a machine learning block.

When the sets of machine learning parameters are predetermined, in some embodiments, a selected set may be indicated via "updating" parameters, which include a smaller set of parameters to facilitate improving compression efficiency (e.g., reducing overhead). In fact, in some embodiments, the predetermined machine learning parameters may be buffered, for example, similar to buffering a reference image. A signal (e.g., per picture, per region, per slice, per CTU, or per CU) may indicate an associated set of machine learning parameters. Appropriate management may be used to add new, update, and/or remove the sets of machine learning parameters (e.g., models).

With regard to determining expected video quality, in some embodiments, a machine learning block may process distortion measurements computed using more conventional metrics, for example, instead of directly processing input image data. For example, MSE or PSNR for each frame in a sequence, overlapping regions in an image, and/or or non-overlapping regions in an image may be determined. A machine learning block may then analyze these statistics spatially and/or temporally. That would result in tremendous complexity reduction and would provide information that is lacking other video quality analysis techniques, for example, by providing spatial and/or temporal pooling of the results. In some embodiments, multiple metrics or features could be computed per region. In this manner, a vector of information for each region in each frame may be determined. Such statistics may then be input to the machine learning for analysis, for example, by processing N frames at a time using a sliding window and/or non-overlapping windows.

In some embodiments, convolutional neural network techniques may be augmented/adapted using traditional signal processing concepts. For example, this may facilitate accounting for parallelization (e.g., overlapping or non-overlapping segment processing). Moreover, the techniques described in the present disclosure may additionally or alternatively be implemented to improve other types of coding, such as 3D/Multiview, depth encoding, 360 video, scalable encoding, and/or the like.

To facilitate improving transcoding, it is desirable to transcode a bit stream using a lower bitrate, possible lower resolution and lower frame rate. By analyzing using machine learning techniques, characteristics of a bit stream may be determined and, for example, indicated in a metadata file and/or derived at the decoder stage of the transcoder. Given analysis of the bit stream and/or other relevant conditions (e.g., network information, display/device capabilities, current power usage, resource information, applications running on the device, and/or expected user streaming behaving), a convolutional neural network may determine "coding control" parameters for encoding the video. These could include QP for the frame or regions, GOP structure, intra frames, lambda parameters for mode decision and motion estimation (e.g., if used by transcoder), downscaling ratio as well as filters for the downscaling. In some embodiments, a convolutional neural network may be implemented to facilitate performing motion compensated temporal filtering, which at least in some instances may further assist with compression through pre-filtering.

Additionally, in a scenario where multiple streaming users have different needs, a convolutional neural network may determine (e.g., compute) one or more target rates that should be generated and generate additional bit streams accordingly. In this scenario, adaptive streaming may occur as a mix of transcoding and bit stream switching, for example, with a server sending N coarse bit streams to a transcoder and the transcoder generating M finer bitrates, which may be picked up by the users using adaptive streaming (e.g., DASH or HLS schemes).

In some of the above embodiments, the machine learning techniques may be implemented to facilitate improving video processing, for example, by using identified feature metrics in the coding decision process for a codec, such as AVC, HEVC, or the like. For example, with regard to intra prediction, a machine learning block may select an intra prediction mode from among multiple candidate intra prediction modes provided by a codec. Similarly, with regard to inter prediction, the machine learning block may select an inter prediction mode from among multiple candidate intra prediction modes provided by the codec.

Moreover, in some embodiments, the machine learning block may select between multiple candidate prediction modes identified using base prediction techniques. For example, using base inter prediction techniques, an inter prediction block may implement base inter prediction techniques to determine multiple best candidate inter prediction modes (e.g., motion vectors) each corresponding with a different block size and/or a different reference index. By processing (e.g., analyzing) results of a best candidate inter prediction mode, the machine learning block may determine a feature metric indicative of resulting distortion. The feature metric along with one or more other metrics may be considered for mode decision. For example, the feature (e.g., distortion) metric may be used in combination with a bit rate metric in an optimized mode decision (e.g., using lagrangian optimization).

In such instances, this may enable a machine learning encoding pipeline to be compatible with a non-machine learning (e.g., conventional) decoding pipeline. Moreover, in some embodiments, the machine learning techniques may be implemented as a coding mode in the codec, for example, as a selectable alternative to base coding modes (e.g., techniques) implemented in the main encoding or decoding pipeline.

In some codecs, to implement inter prediction, one or more interpolation filters may interpolate image data samples. For example, the interpolation filters may include a separable N×1 horizontal filter and 1×N vertical filter. By leveraging machine learning techniques, a video encoding pipeline may perform inter prediction with a higher than integer precision. In some embodiments, a machine learning block may implement machine learning techniques to facilitate selecting interpolation filter parameters from multiple predetermined sets of interpolation filter parameters.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding pipeline comprising:
a main encoding pipeline implemented in an electronic device, wherein the main encoding pipeline is configured to compress source image data corresponding with at least a portion of an image frame by processing training image data and the source image data based at least in part on encoding parameters to generate encoded image data;
a machine learning block communicatively coupled to the main encoding pipeline; and
an adversarial machine learning block communicatively coupled to the main encoding pipeline, wherein:
the machine learning block is configured to:
process the source image data based at least in part on one or more machine learning parameters to determine one or more expected characteristics of the at least a portion of the image frame, wherein the one or more machine learning parameters are configured to determine one or more characteristics expected to be present in training image data;
the adversarial machine learning block is configured to:
generate additional training image data configured to cause the machine learning block to detect a false positive in at least one of the at least a portion of the image frame;
adjust the one or more machine learning parameters implemented in the machine learning block based at least in part on the one or more expected characteristics of the at least a portion of the image frame and the additional training image data, wherein the machine learning block is configured to process additional source image data based at least in part on the one or more adjusted machine learning parameters to determine one or more additional expected characteristics expected to be present in the at least a portion of the image frame; and the video encoding pipeline is configured to adaptively adjust the encoding parameters based at least in part on the one or more additional expected characteristics.

2. The video encoding pipeline of claim 1, wherein the one or more machine learning parameters are determined using previously encoded training image data previously processed via the main encoding pipeline, wherein the previously encoded training image data is associated with the training image data.

3. The video encoding pipeline of claim 1, wherein the machine learning block is recursively trained in one or more cycles until a number of cycles has been performed.

4. The video encoding pipeline of claim 1, wherein the encoding parameters comprises a target sampling ratio, a target sampling mode, or both.

5. The video encoding pipeline of claim 1, wherein the main encoding pipeline is configured to:
determine a prediction sample that indicates a prediction of the training image data by down-sampling the training image data, applying a forward transform, applying a forward quantization, applying an inverse quantization, and up-sampling based at least in part on the encoding parameters;
determine a prediction residual based at least in part on a difference between the prediction sample and the training image data; and
generate the encoded image data to indicate at least the encoding parameters and the prediction residual.

6. The video encoding pipeline of claim 1, wherein the machine learning block, the adversarial machine learning block, or both are separate from the electronic device and communicatively coupled to the electronic device via a communication network.

7. The video encoding pipeline of claim 1, wherein:
the adversarial machine learning block comprises:
a first convolution layer configured to determine a first additional characteristic falsely representative of a first characteristic of the one or more characteristics expected to be present in the at least a portion of the image frame by processing the training image data and the source image data based at least in part on a first convolution weight implemented in the first convolution layer; and
a second convolution layer connected downstream of the first convolution layer, wherein the second convolution layer is configured to determine a second additional characteristic falsely representative of a second characteristic of the one or more characteristics expected to be present in the at least a portion of the image frame based at least in part on the first additional characteristic and a second convolution weight implemented in the second convolution layer.

8. The video encoding pipeline of claim 7, wherein the adversarial machine learning block is configured to adaptively generate the additional training image data based at least in part on the first additional characteristic, the second additional characteristic, or both.

9. A method, comprising:
processing, via at least one processor, training image data based at least in part on one or more machine learning parameters to determine one or more expected characteristics of at least a portion of an image frame, wherein the one or more machine learning parameters are configured to determine one or more characteristics expected to be present in the training image data;
receiving, via the at least one processor, additional training image data configured to cause the at least one processor to detect a false positive in the at least one of the at least a portion of the image frame; and
adjusting, via the at least one processor, the one or more machine learning parameters based at least in part on the one or more expected characteristics of the at least a portion of the image frame and the additional training image data, wherein the at least one processor is configured to process source image data based at least in part on the one or more adjusted machine learning parameters to determine one or more additional expected characteristics expected to be present in the at least a portion of the image frame.

10. The method of claim 9, wherein the one or more machine learning parameters are determined using previously encoded training image data, wherein the previously encoded training image data is previously processed with the training image data.

11. The method of claim 9, comprising tracking, via the at least one processor, a number of cycles that the at least one processor adjusts the one or more machine learning parameters.

12. The method of claim 11, comprising comparing, via the at least one processor, the number of cycles to a training threshold wherein the processor is configured to adjust the one or more machine learning parameters in response to the number of cycles being greater than the training threshold.

13. The method of claim 12, comprising increasing the training threshold in response to determining that the at least one or more expected characteristics are falsely detected from the training image data.

14. The method of claim 9, wherein generating the additional training image data comprises:
determining, via the at least one processor, a first additional characteristic that falsely represents a first characteristic of the one or more characteristics expected to be present in the at least a portion of the image frame based at least in part on processing the training image data using a first convolution weight implemented in a first convolution layer;
determining, via the at least one processor, a second additional characteristic that falsely represents a second characteristic of the one or more characteristics expected to be present in the at least a portion of the image frame based at least in part on the first additional characteristic and a second convolution weight implemented in a second convolution layer; and
generating, via the at least one processor, the additional training image data based at least in part on the first additional characteristic, the second additional characteristic, or both.

15. A computer-readable medium comprising computer-executable instructions that, when executed by a processor, are configured to cause the processor to perform operations comprising:
processing training image data based at least in part on one or more machine learning parameters to determine one or more expected characteristics of at least a portion of an image frame, wherein the one or more machine learning parameters are configured to determine one or more characteristics to be present in the training image data;

generating additional training image data configured to cause an image processing system to detect a false positive in at least one of the at least a portion of the image frame; and adjusting the one or more machine learning parameters based at least in part on the one or more expected characteristics of the at least a portion of the image frame and the additional training data, where the image processing system is configured to process source image data based at least in part on the one or more adjusted machine learning parameters to determine one or more additional expected characteristics expected to be present in the at least a portion of the image frame.

16. The computer-readable medium of claim 15, wherein the one or more machine learning parameters are determined using encoded training image data previously processed by the processor, wherein the previously encoded training image data is associated with the training image data.

17. The computer-readable medium of claim 15, wherein the computer-executable instructions that, when executed by the processor, are configured to cause the processor to perform the operations comprising tracking a number of cycles that the processor adjusts the one or more machine learning parameters.

18. The computer-readable medium of claim 17, wherein the computer-executable instructions that, when executed by the processor, are configured to cause the processor to perform the operations comprising:

comparing the number of cycles to a training threshold; and adjusting the one or more machine learning parameters in response to the number of cycles exceeding the training threshold.

19. The computer-readable medium of claim 18, wherein the computer-executable instructions that, when executed by the processor, are configured to cause the processor to perform the operations comprising increasing the training threshold in response to the image processing system falsely detecting the at least one or more expected characteristics in the training image data.

20. The computer readable medium of claim 15, wherein the computer-executable instructions that, when executed by the processor, are configured to cause the processor to generate the additional training image data comprises:

determining a first additional characteristic falsely representative of a first characteristic of the one or more characteristics expected to be present in the at least a portion of the image frame by processing the training image data based at least in part on a first convolution weight implemented in a first convolution layer;

determining a second additional characteristic falsely representative of a second characteristic of the one or more characteristics expected to be present in the at least a portion of the image frame based at least in part on the first additional characteristic and a second convolution weight implemented in a second convolution layer; and generating the additional training image data based at least in part on the first additional characteristic, the second additional characteristic, or both.

* * * * *